Feb. 22, 1944.   G. GORTON   2,342,539
INDEXING OR POSITIONING HEAD
Filed Dec. 4, 1942   11 Sheets-Sheet 1
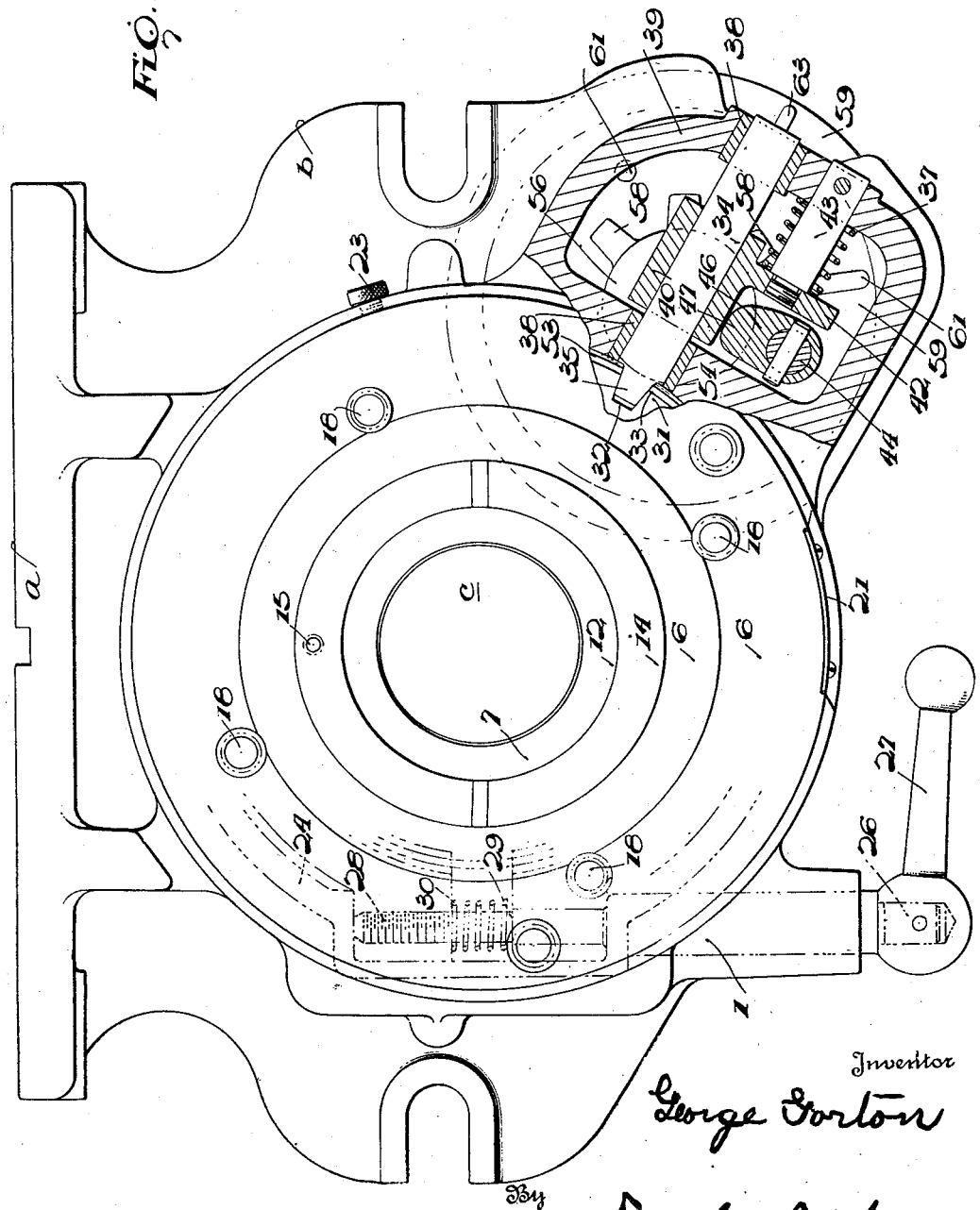

Feb. 22, 1944.　　　　G. GORTON　　　　2,342,539
INDEXING OR POSITIONING HEAD
Filed Dec. 4, 1942　　　11 Sheets-Sheet 2
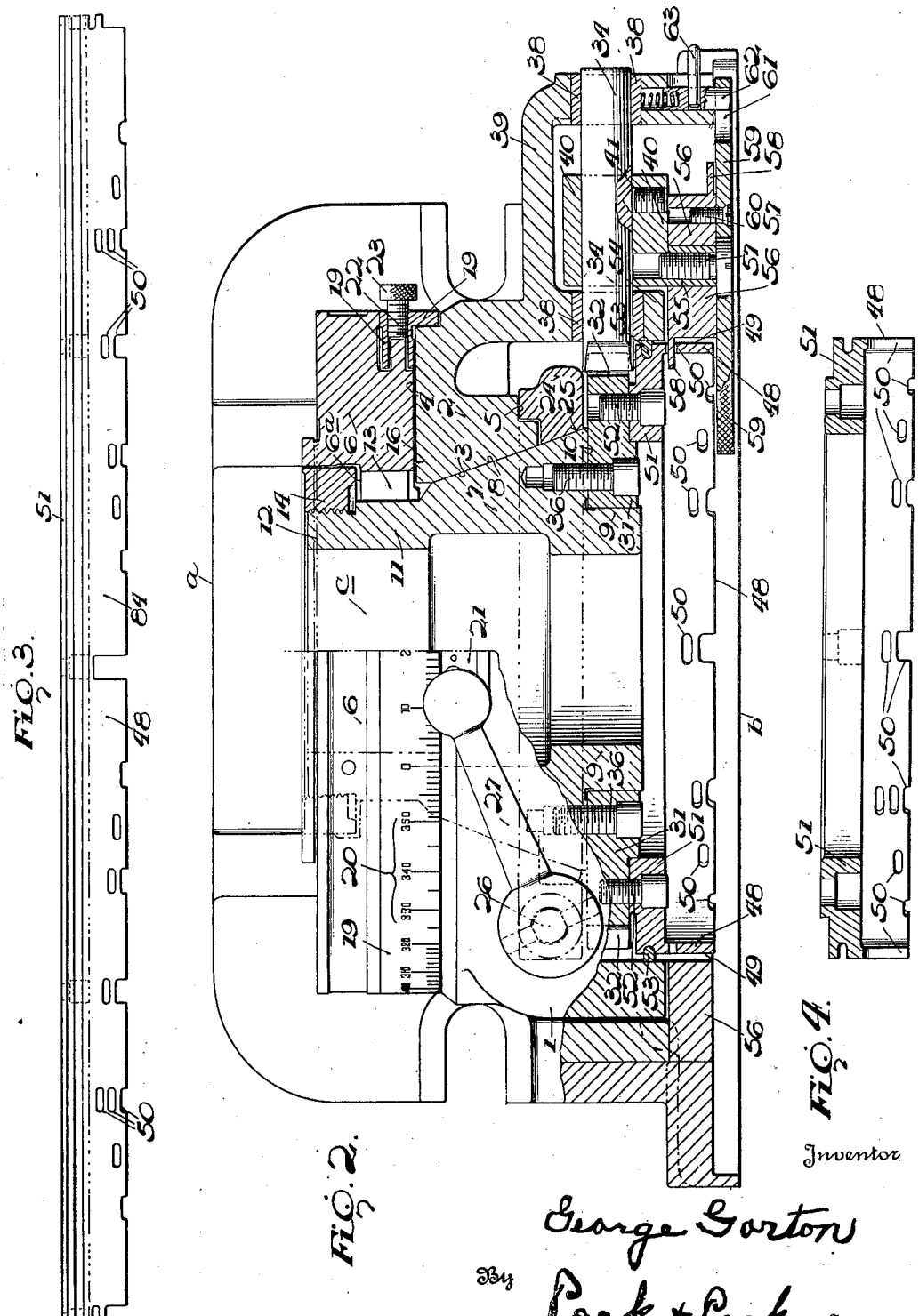
Inventor
George Gorton
By Peck + Peck Attorney

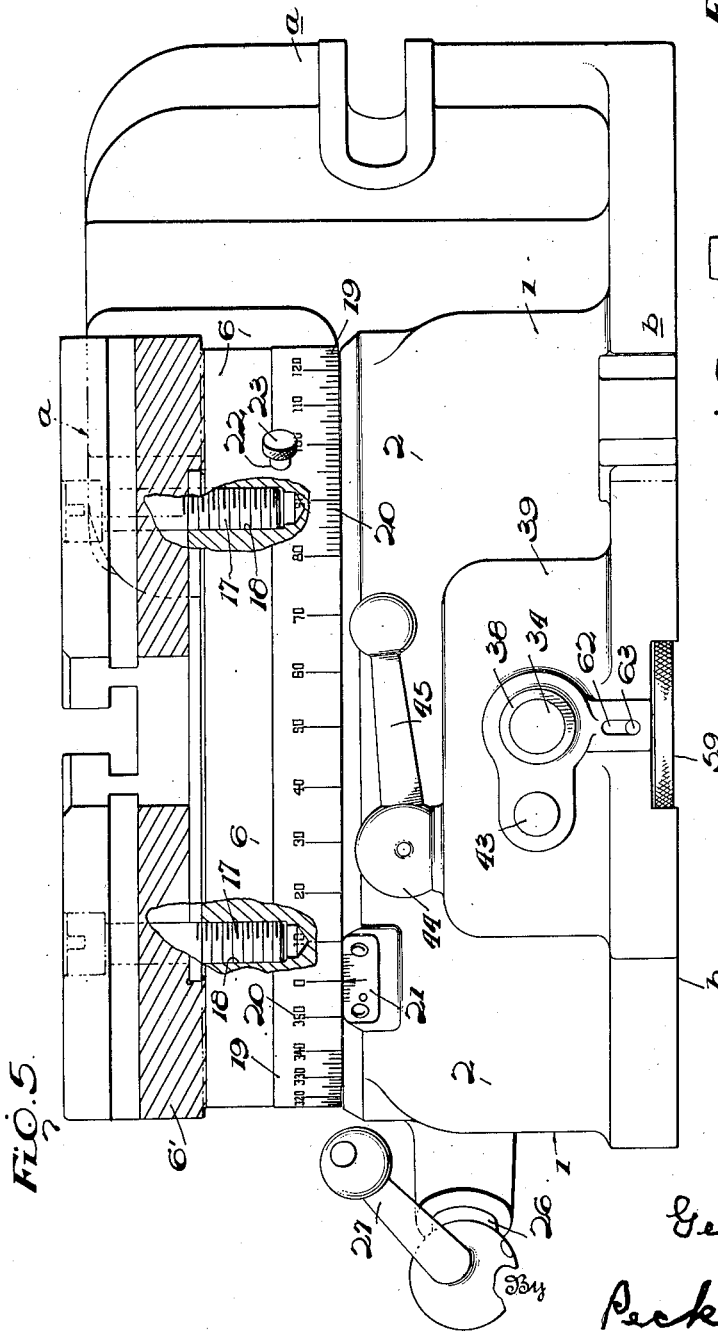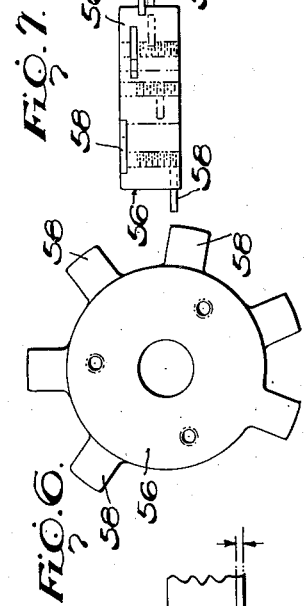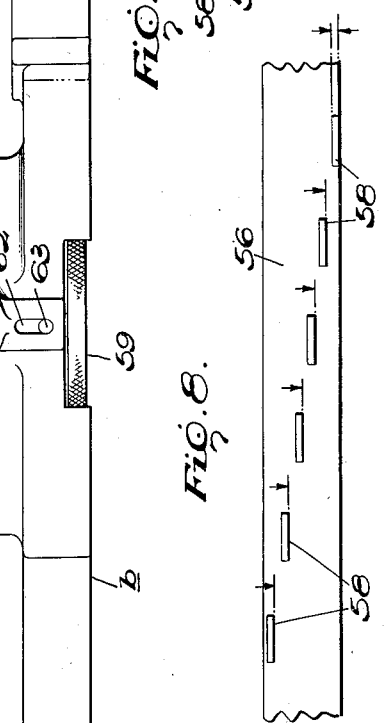

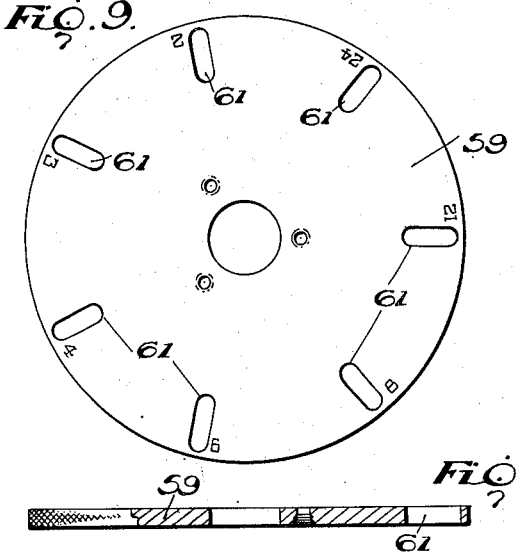
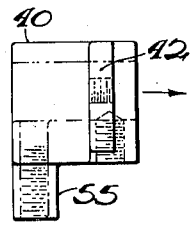
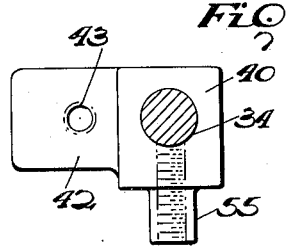
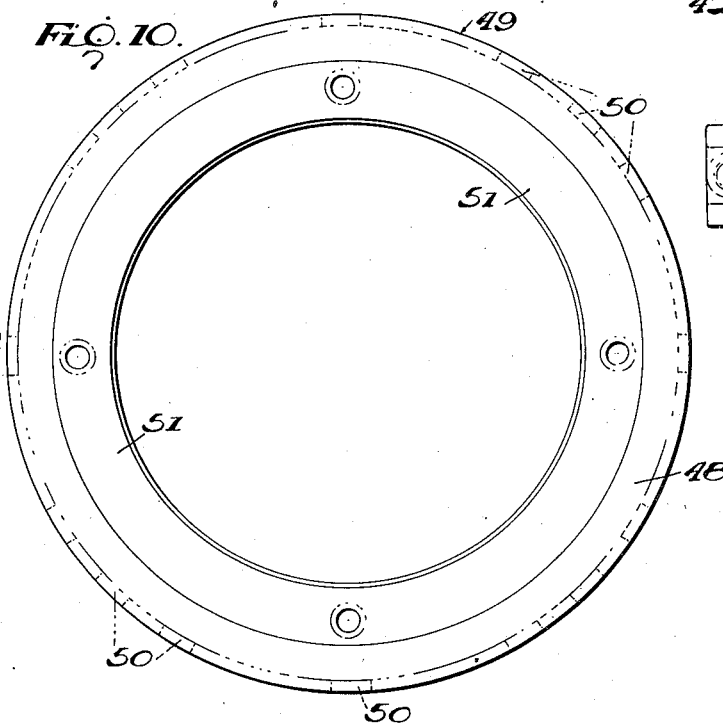
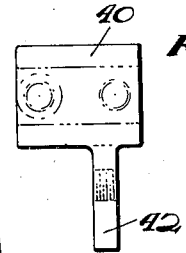

Feb. 22, 1944. G. GORTON 2,342,539
INDEXING OR POSITIONING HEAD
Filed Dec. 4, 1942 11 Sheets-Sheet 6
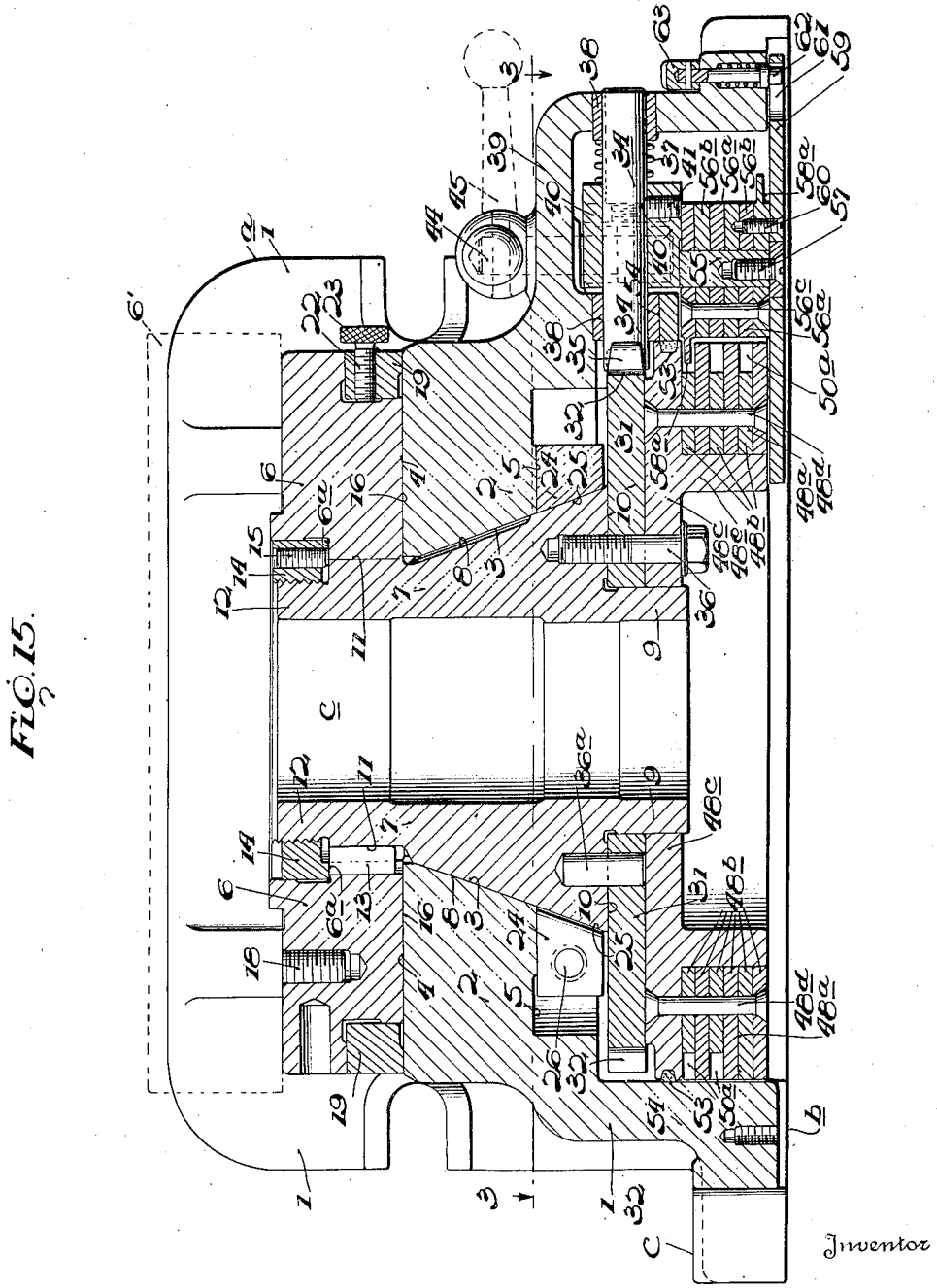
Inventor
George Gorton
By Peck & Peck Attorneys Feb. 22, 1944.    G. GORTON    2,342,539
INDEXING OR POSITIONING HEAD
Filed Dec. 4, 1942    11 Sheets-Sheet 7
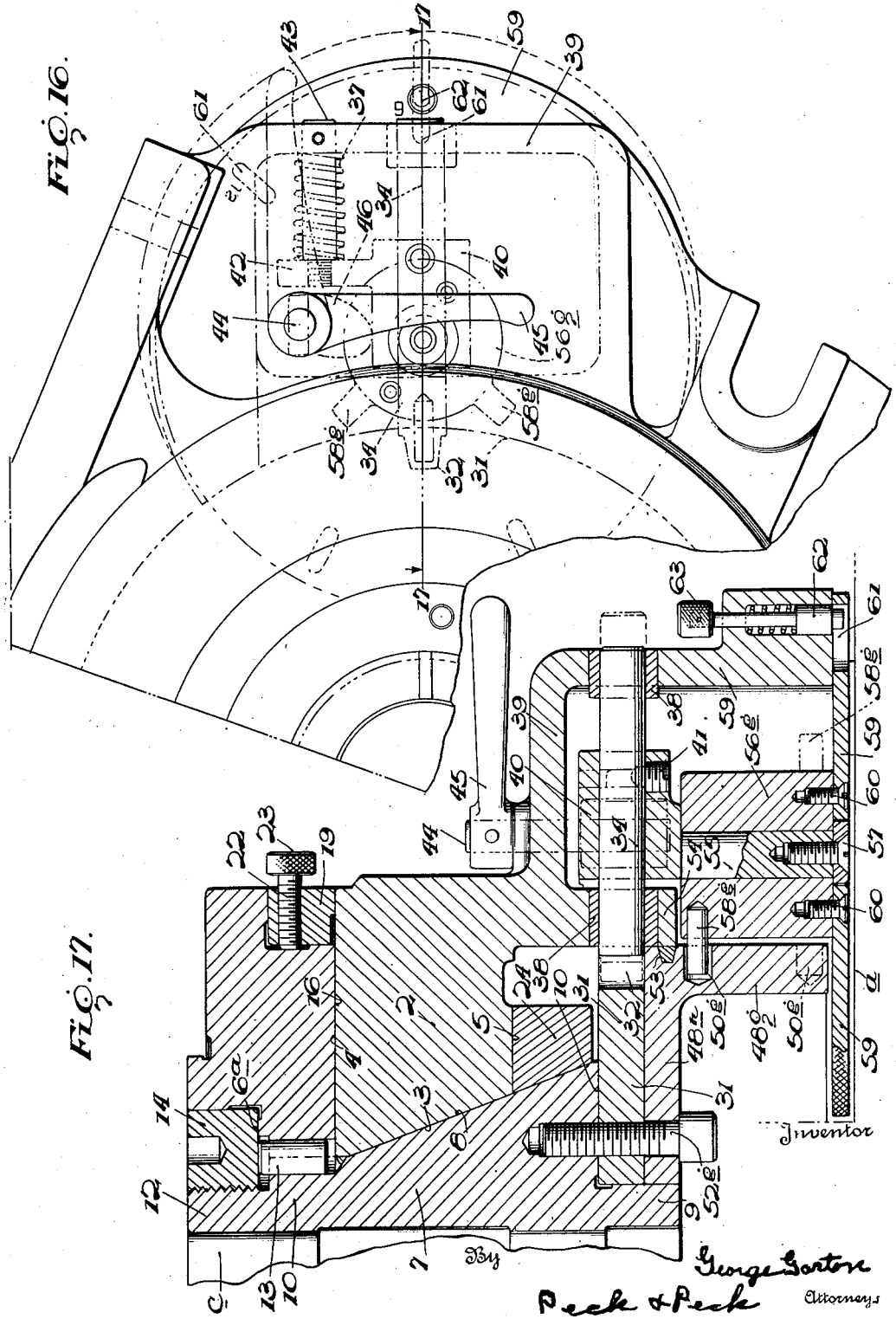

Feb. 22, 1944. G. GORTON 2,342,539
INDEXING OR POSITIONING HEAD
Filed Dec. 4, 1942 11 Sheets-Sheet 8
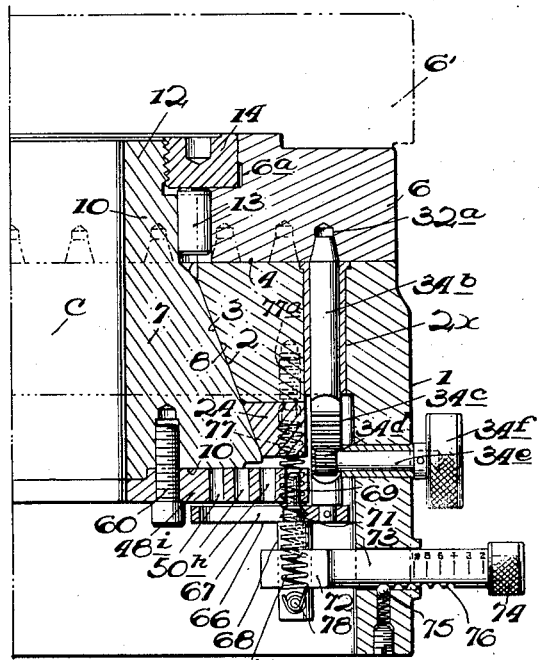
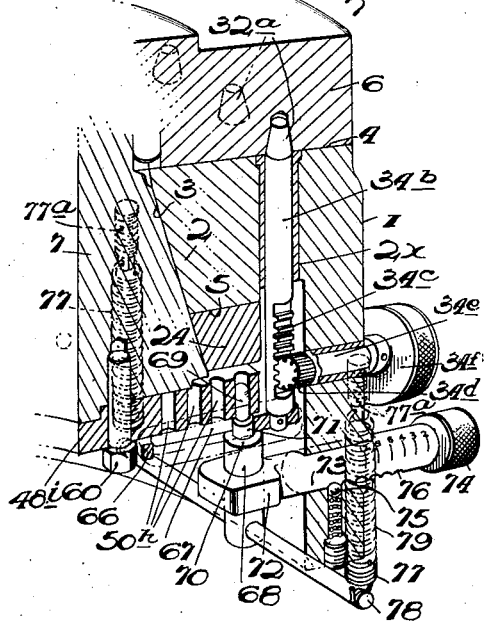
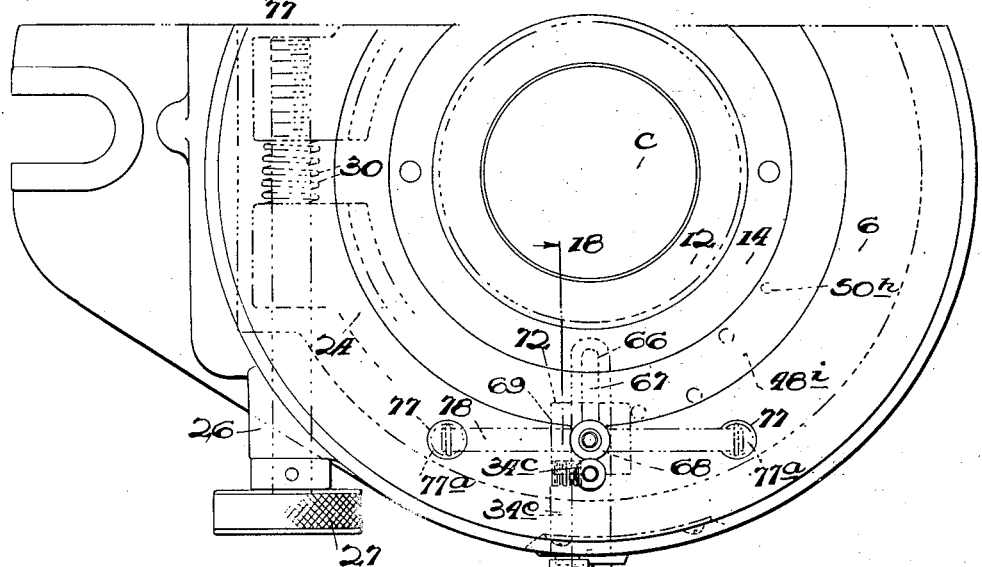
Inventor
George Gorton
By Peck + Peck Attorneys

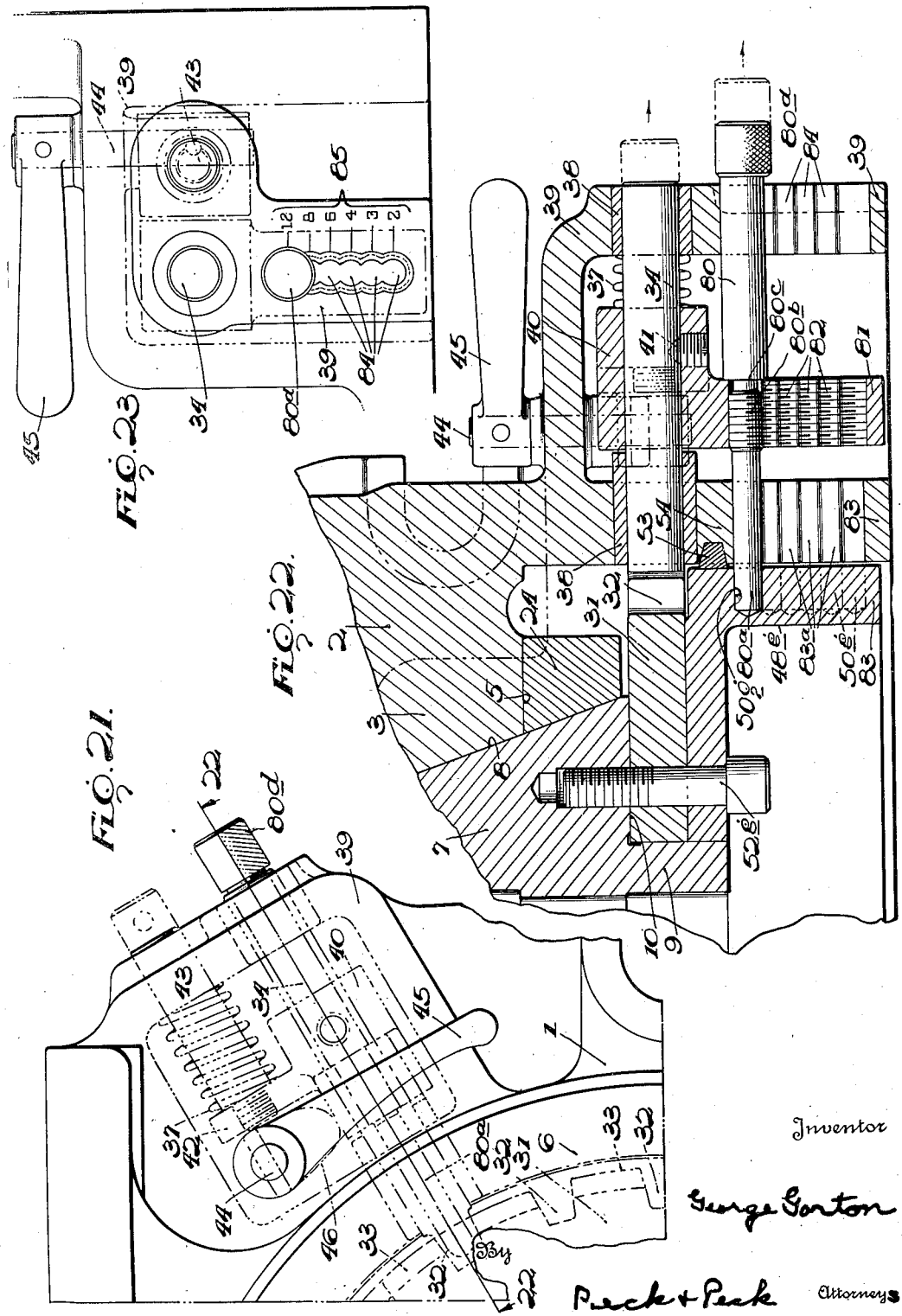

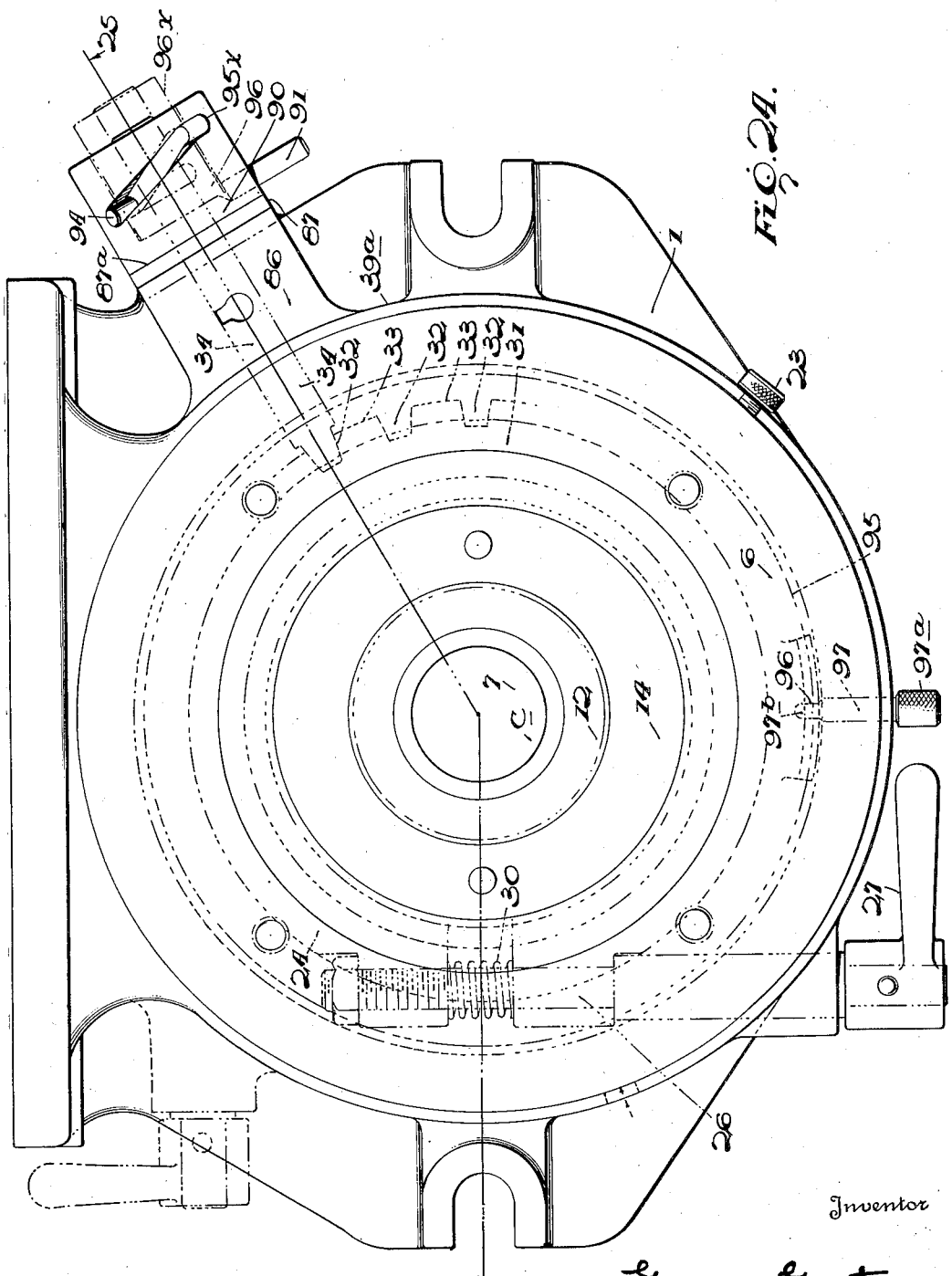

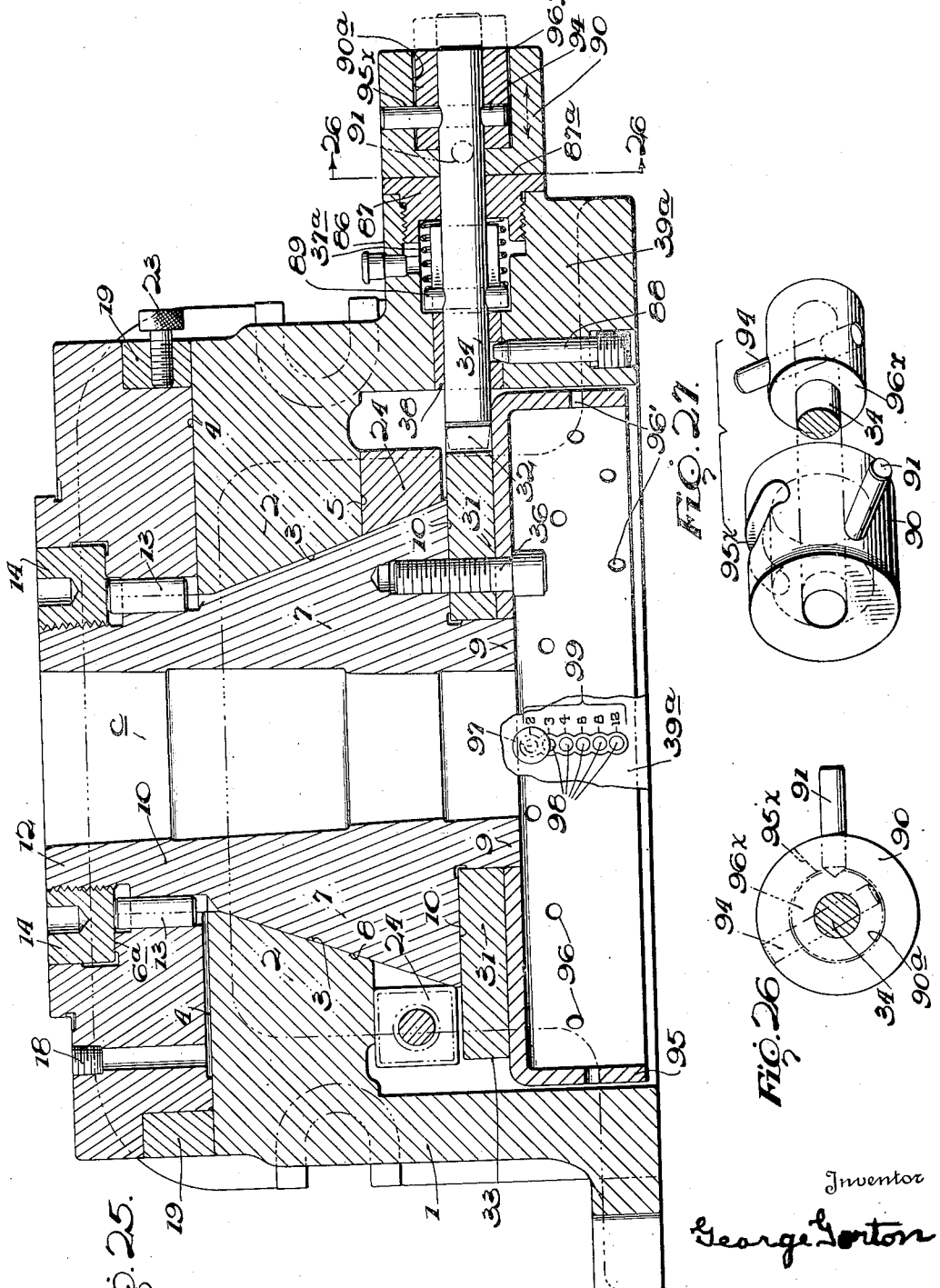

Patented Feb. 22, 1944

2,342,539

UNITED STATES PATENT OFFICE 2,342,539

INDEXING OR POSITIONING HEAD

George Gorton, Racine, Wis., assignor to George Gorton Machine Co., Racine, Wis., a corporation of Wisconsin Application December 4, 1942, Serial No. 467,892

25 Claims. (Cl. 90—57)

This invention relates to indexing or positioning heads; and the objects and nature of the invention are set forth and developed by the following explanations of the example mechanical expressions or embodiments of the invention disclosed by the accompanying drawings, from among other structures, modifications, and other organizations within the spirit and scope of the invention.

An object of the invention is to provide a work positioning and indexing head, adapted to be removably or otherwise secured to the work table or other appropriate part of a machine tool, to hold the work in the desired operative working relation to the boring, cutting or other tool operated by said machine; with said head provided with improved means to positively and with accuracy attain rotative indexing or spacing of the work to a predetermined number of angular positions or divisions.

A further object of the invention is to provide an indexing head for a work or other holder, of the general type having major indexing means for indexing through, say 360°, with equally-spaced stopping points or divisions, say every 10°, or 15°, or otherwise; with improved selector or like mechanism, whereby said holder can be rotatively or angularly indexed through various sub-numbers of divisions or stopping points that are irregularly or otherwise spaced, where said various sub-numbers constitute denominators of the total major number of stopping joints provided for by said major indexing means, without the necessity of providing separate removable selector plates or the like, one for each different number of sub-divisions or stopping points, that necessitates removing a selector plate and substituting therefor another selector plate, whenever it is necessary to change the sub-number of divisions, within the number of uniformly-spaced major indexing divisions.

And a further object of the invention is to provide certain improvements in parts, details, and sub-combinations, with the end in view of producing a highly advantageous and efficient indexing head for a work or other holder.

With the foregoing objects in view, and others that will be developed by the following explanations, my invention consists in certain novel structures, combinations, features, and arrangements, as more fully hereinafter described, and specified by and in the appended claims.

Referring to the accompanying drawings, forming a part hereof:

Fig. 1 shows a preferred embodiment of my invention, in top plan, with a portion of the top wall of the hollow base broken away, the top work holder, not being shown, certain parts within the hollow base being indicated by dotted lines.

Fig. 2 shows the machine of Fig. 1, partially in side elevation, and partially in central vertical section, the work holder normally secured to the turret face plate, not being shown.

Fig. 3 is a detail diagrammatical flat view or development of the sub-divisional indexing drum of the machine of Fig. 1, illustrating an example arrangement of the series of sub-divisional indexing stops or sockets.

Fig. 4 is a detail vertical section of said sub-divisional indexing drum.

Fig. 5 is a perspective view of the machine of Fig. 1, a work holder being shown by dotted lines secured to the indexing turret.

Fig. 6 is a detail top plan view of the sub-divisional indexing selector and locking rotor of the machine of Fig. 1.

Fig. 7 is a detail side elevation of said rotor.

Fig. 8 is a detail diagrammatical flat view or development of the circumference of said rotor to show an example arrangement of the radial locking fingers or bolts of said rotor.

Fig. 9 is a detail top plan view of the selector and locking disk of said rotor of the machine of Fig. 1.

Fig. 9a is a detail central cross section of said disk.

Fig. 10 is a detail top plan view of the sub-divisional drum shown by Figs. 3 and 4.

Fig. 11 is a detail side elevation of a block normally fixed to the master indexing plunger to carry the said sub-divisional rotor.

Fig. 12 is a detail end elevation of said block.

Fig. 13 is a detail top plan view of said block.

Fig. 15 is a vertical section of the machine of Fig. 1, taken on the line 15—15, Fig. 14, showing a modified sub-divisional indexing drum and its complementary selector and locking rotor, substituted therein for the sub-divisional drum and rotor of Figs. 2, 3, 4, and 6 to 8.

Fig. 16 is a detail top plan view of a portion of a machine of substantially the same construction as the machine of Fig. 1.

Fig. 17 is a vertical section of the disclosure of

Figure 14:
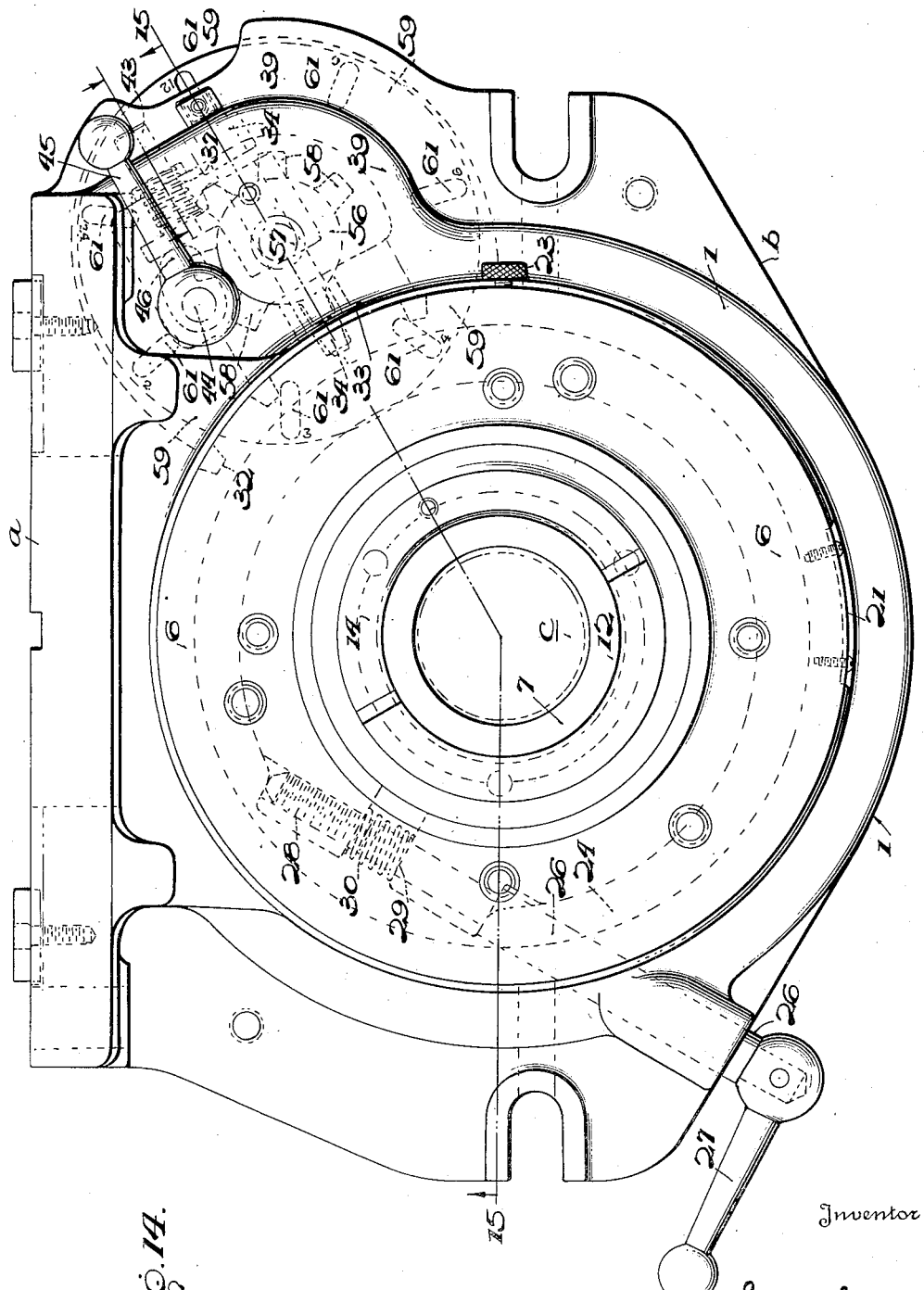
Fig. 14 is a top plan view of the machine of Fig. 1, many parts within the hollow base and a number of the master indexing notches being shown by dotted lines, the relative positions of the clamping lever and the master locking bolt lever, being slightly different than those shown by Fig. 1.

Fig. 16, taken on the line 17—17, showing the basic organization having a modified sub-divisional indexing drum and its complementary selecting and locking rotor substituted for the drum and rotor shown by Fig. 2.

Fig. 18 is a vertical section taken on the line 18—18, Fig. 19, showing a modified master and sub-divisional indexing organization, within the scope of my instant invention.

Fig. 19 is a top plan view of a portion of an indexing head of my invention.

Fig. 20 is a detail sectional perspective of the organization of Figs. 18 and 19.

Fig. 21 is a top plan view of a portion of the indexing head of my instant invention, dotted lines showing several of the master indexing stops or sockets, and the master locking bolt and its operating means, also showing a portion of a modified sub-divisional indexing selector and locking means.

Fig. 22 is a vertical section on the line 22—22, Fig. 21, illustrating a modified sub-divisional indexing organization.

Fig. 23 is a side elevation showing a portion of the exterior of the hollow base housing the organization disclosed by Figs. 21 and 22.

Fig. 24 is a top plan view of an indexing head of my invention showing modified means for controlling the master indexing bolt or plunger and also showing modified sub-divisional indexing means.

Fig. 25 is a vertical section taken on the line 25—25, Fig. 24.

Figs. 26 and 27 are detail detached views of the cam device for withdrawing and releasing the master bolt or plunger.

The embodiments of my invention disclosed, provide a main frame or base 1, which can be in the form of a strong hollow body, such as a casting, although I do not intend to so restrict the invention. For instance, this body 1, can form exterior flat seating faces a, b, one perpendicular to the other, for alternatively fitting on and securing to the work table or other desired part of a machine tool or the like, as is common practice in this art. Thus, when the head is secured to the machine table by one of said faces, the indexing head, will be vertical, when secured by the other face, the head will be horizontal.

This base 1, includes as a rigid part thereof, an elevated horizontal annular strong stiff portion 2, that provides the base with an annular bore extending longitudinally through the base with its longitudinal axis perpendicular to seating face b, and parallel with and spaced laterally from the seating face a. This bore includes the annular central longitudinal tapered bearing surface 3, that enlarges downwardly, and is of truncated conical form.

The rigid annular base portion 2, also provides a top horizontal usually-flat rigid annular bearing surface 4, surrounding the bore and usually located in a plane more or less above the upper end of tapered bearing surface 3, and perpendicular to the axis of said bore.

The rigid annular portion 2, can, if so desired, provide at its under side, a downwardly facing usually flat annular surface 5, located in a transverse plane that intersects, usually, but not necessarily, the lower portion of the tapered rigid vertical bearing surface 3, a distance above the enlarged lower end of said tapered surface.

A turret, rotor or head, adapted to carry the work holder, is rotatably mounted in or to the base 1, and said head includes an exterior transverse face plate 6, having a central longitudinal spindle or shaft 7, rigid therewith and extending therefrom into the hollow base 1, and centrally and longitudinally through, and inwardly beyond, the conical or tapered bore 3, of the annular rigid portion 2, of said base.

This spindle 7, is, preferably, of sturdy strong formation, and intermediate its length, provides an elongated upwardly or outwardly reducing longitudinally tapered or conical portion having exterior tapered bearing surface 8, complementary to and having rotatable sliding contact with the opositely-tapered bearing surface 3, of the rigid annulus 2, of the base. The taper 8, of the spindle 7, is, preferably of greater length than the taper 3, of said annulus 2, and hence extends longitudinally into the hollow base a more or less substantial distance beyond the transverse bottom face 5, of annulus 2, for the reception of an exterior clamping ring surrounding the large-diameter lower end of the taper 8, below annulus face 5, as described hereinafter. The lower end portion of said spindle 7, is preferably annularly reduced in diameter to provide a central longitudinal reduced-diameter, preferably, cylindrical end 9, and a substantially flat annular downwardly facing shoulder or seat 10.

The outer central longitudinal end 11, of the spindle 7, is preferably exteriorly cylindrical, outwardly beyond taper 8, and outer face 4, of the rigid annulus 2. The outer extremity 12, of end 11, is preferably of reduced diameter and externally and longitudinally screw threaded.

The horizontally or transversely arranged face plate 6, preferably externally cylindrical and of sturdy formation, is centrally mounted on the upper end of spindle 7, and normally rigidly secured thereto to rotate therewith. For instance, the face plate is formed with a central bore extending longitudinally therethrough to receive and center the plate on the end 11, of the spindle, and the plate can be coupled to the spindle by a screw-threaded clamping nut 14, countersunk in the top of the plate 6, and normally locked by set screw 15, if so desired. This nut 14, is of ring form, and its internal thread meshes with the screw thread on the extremity 12, of the spindle to normally hold the spindle and face plate together to rotate as a unit.

The annular transverse inner or bottom surface 16, of the face plate 6, is preferably flat to rest on the complementary outer or top face 4, of the rigid annulus 2, in slidable relation.

In the arrangement disclosed, without desiring to so specifically limit all features of my invention, it will be noted that the spindle 7, is in effect, suspended or hung by its upper end, from the face plate 6, and thus supported from the face 4, of the rigid annulus 2, through the medium of the face plate 6, resting on said face 4. The inwardly-enlarging longitudinal taper 8 of the spindle is thus longitudinally held outwardly, in the desired close bearing contact with the complementary oppositely-tapering longitudinal bearing surface 3, of the rigid annulus 2. The sliding contact between the complementary longitudinally-tapering bearing surfaces 3, and 8, of said annulus and the spindle 7, can hence be adjusted to take up wear or for other reasons by slightly moving the spindle 7, longitudinally with respect to the face plate 6, as by relatively rotating ring 14, in the required direction.

In this particular example, the spindle 7, is longitudinally slidable in the transverse face plate socket or bore, while such spindle is held against relative rotary movement on its longitudinal axis. Thus, where the reduced end 11, of the spindle is exteriorly cylindrical and the complementary central transverse bore or socket of the face plate is also cylindrical, the spindle can be held against such rotation by splines or keys 13, while free to slide in the bore or socket for longitudinal adjustment, when released by the nut 14.

If so desired, the face plate 6, can be formed with an annular depressed channel surrounding the upper or outer end of the central transverse bore or socket that receives the spindle end, and this channel provides a rigid outwardly facing annular shoulder 6a, against which the lower or inner end of the ring nut 14, is adapted to abut, and thus uphold or stop the spindle 7, against relative longitudinal downard or inward movement. The upper end 12, of the spindle is also of reduced diameter, so that an annular groove is provided in which the ring nut is countersunk. The spindle can be raised or lowered with respect to the face plate by rotation of nut 14, and the nut upholds the spindle by abutting and resting on shoulder 6a. The nut 14, is exteriorly provided with accessible sockets or depressions, by which the nut can be rotated through the medium of any suitable tool or instrument.

The face plate 6, is adapted to receive any suitable work holder, seated on the top surface of said plate, for normal rigid securing thereto. The work holder is preferably substitutionally rigidly secured to said plate, to permit substitution of one type of work holder for another. For instance, in the drawings I show a work holder, in the form of a top work table 6', rigidly yet removably secured on the face. Another form of work holder, such as a work holding chuck (not shown), can be substituted for the table 6', as is common practice in this art.

Furthermore, if so desired, the spindle can be formed with a central longitudinal bore c, extending throughout its length, to receive (when the work holder, for instance, work table 6', is removed from the top of face plate 3), a work holding collet, or other work holding device, according to common practice in this art.

Any suitable means can be provided for centering and rigidly, yet removably, clamping the usually circular work table 6', on the face plate 6, although in the drawings, I happen to show one or more, threaded bolts or headed screws 17, removably extending through longitudinal holes in the table and entering screw threaded sockets 18, in the face plate.

The work table 6', can be provided with the usual T-slots and appropriate adjustable headed bolts, or any other suitable means for clamping and positioning the work thereon.

In the examples disclosed, the face plate 6, is provided with a relatively rotatable graduated dial, in this instance, in the form of a cylindrical ring 19, concentric with the longitudinal axis of spindle 7, and surrounding the lower or inner end of said plate, and inset in an annular channel surrounding said inner or lower end and open at its bottom. The ring 19, slidably contacts the cylindrical longitudinal inner and the annular transverse top wall of said channel and at its lower annular transverse bottom wall said ring rests on and slidably engages the top transverse annular face 4, of the rigid annular portion 2, of the base.

The exposed circumferential surface of this ring is visibly graduated preferably from zero to 360°, to thus provide scale 20.

If so desired, a visible vernier 21, can be located at the exterior of the hollow base, in close visible cooperative relation to the scale 20, for use in accurate setting of the rotary turret or head, to minutes of a degree or to finer or smaller subdivisions than those of scale 20. The vernier is fixedly located, and preferably includes an index or zero mark or line, for visible cooperation with the zero mark of scale 20. The rotatable graduated ring 19, is normally fixedly held to the face plate 6, by clamping screw 22, having an exterior accessible head 23, by which the screw can be operated to release and clamp the ring. The screw is in mesh with the thread of a hole extending radially through the ring, so that the inner end of the screw can abut the longitudinal inner wall of the ring channel to lock and release the ring.

This ring can be released and relatively rotated on the face plate, to bring the zero mark on its scale 20, to any desired angular position, whereupon the ring is locked by screw 22. This arrangement of rotatable ring 19, and scale 20, is provided for use where indexing requires odd spacings or divisions not possible to attain with the hereinafter described master index member, alone.

Any suitable means is provided whereby the rotary head or turret 6, 7, can be rigidly locked to the hollow base in any desired angular position against relative rotary movements, and whereby said head can be released for relatively rotatable movements.

For example, without desiring to so limit the invention, I show a contractile split-spring clamping ring 24, surrounding the lower or enlarged end portion of the taper 8, of the spindle 7, and normally held expanded from braking or clamping contact with said surface 8, of the spindle. The inner longitudinal annular wall surface 25, of this ring is longitudinally tapered to snugly fit the tapered surface 8, of the spindle, and hence is complementary thereto for locking and releasing purposes. This clamping ring, at its annular top surface usually slidably abuts the inner or bottom transverse surface 5, of the rigid base annulus, while the ring is approximately upheld by its upwardly contracting tapered bore overhanging and resting down on the downwardly enlarging taper 8, of spindle 7. The spring clamping ring is thus located in an annular space within and exteriorly enclosed by the base and surrounding the spindle.

This clamping ring is contracted to clamping locking position, and released for expansion to free the turret spindle, by a rotary clamping shaft or screw 26, rotatably mounted in the hollow base 1, and exteriorly thereof provided with an accessible handle 27, by which said shaft or screw can be rotated in either direction. This shaft is arranged substantially tangentially of the ring 24, and at its inner end within the hollow base extends through both of the radial laterally-spaced ring ends and is rotatable therein.

The shaft 26, in this example, has a longitudinally screw threaded portion 28, arranged in mesh with a correspondingly threaded hole in one of the spring clamping ring ends, for relative shaft rotation, while said shaft is freely rotatable in the opposite end of said ring, and is shouldered at 29, whereby rotation of the screw or shaft 26, in one direction will force the spring ends toward each other to contract the ring on and rigidly clamp or lock spindle 7, while rotation of said shaft in the opposite direction permits expansion of the locking ring to release said spindle for rotation. An expansion coiled spring 30, is usually located loosely on said shaft between the two spring ends, under tension tending to separate said ends of the clamping ring and expand the same.

It is common practice, in this art, broadly, to provide a rotatory indexing head with an annular concentric part rotatable and normally rigid therewith, and providing a visible master index of uniformly spaced stopping points or divisions extending preferably through 360°.

In this instance, I show a master index member, plate, ring or annulus 31, having the annular or circular series of uniformly-spaced major indexing divisions or stopping points, in the form of a circular flat stiff, strong, disk or plate-like ring, of enlarged exterior diameter with respect to the maximum diameter of the spindle 7, and centered on and normally rigidly secured to said spindle. This ring 31, is preferably slipped and centered on and surrounds the cylindrical inner or bottom end 9, of the spindle 7, and fits the transverse face 10, thereof, and is clamped and secured thereto as by one or more bolts 36, passing longitudinally through said ring 31, and screwed into tapped holes in the spindle.

This disk 31, provides the index circle of uniformly spaced major divisions or stopping points, in the form of spindle-lock receiving stations. In other words, each major division is formed to successively receive means for rigidly locking the turret 6, 7, against rotation. In this example, the circumference of disk 31, provides an annular series of similar lock-receiving sockets, depressions or the like, shown in the form of radially-flaring notches 32, radially open through the circumference of the disk and formed by longitudinal open end grooves, although I do not wish to so limit my invention.

I happen to show twenty-four of these lock-receiving sockets 32, uniformly spaced around the circle of the disk 31, but do not wish to so limit my invention, as the major index circle can be made up of twenty-four, thirty-six, or any other suitable number of divisions, although an even or multiple number is preferred.

The arcuate exterior circumferential surfaces 33, of the disk that intervene between the lock-receiving sockets 32, are preferably smooth so that turret locking means can ride thereon and be held back thereby, during indexing rotary movements of the turret 6, 7, from one indexing point to the succeeding one.

Any suitable means can be provided, for locking the turret against rotation by cooperation with said sockets 32, one by one. As one example of such locking means, from among others, that can be employed, I show a longitudinally-slidable index or turret locking bolt or plunger 34, radially arranged exteriorly of and with respect to the major index disk 31, and located in the transverse plane thereof, and having a usually wedge-shaped end 35, complementary to the lock-receiving sockets 32, and adapted to enter said sockets, one by one, to lock the turret 6, 7, in the desired angular position and against rotation.

This plunger is under constant pressure, as by a suitable spring such as 37, to yieldingly force the bolt toward the disk and to maintain the same in locking cooperation with a socket thereof, and to hold the bolt end against the hold back surface 33, of the disk, when riding thereon, during index rotation of the turret, so that the bolt will snap into a succeeding socket 32.

This longitudinally-slidable bolt or plunger 34, is held to straight-line reciprocation, and against objectionable lateral movements, by any suitable means, although I show the same slidably held by rigid hard bushings 38, preferably fixed within a hollow laterally projecting box or housing 39, usually rigid with and forming a part of the hollow base 1.

Any suitable hand or other means is provided for withdrawing the bolt 34, from turret locking position, against the tension of its spring 37, and preferably any suitable mechanism is also provided whereby said bolt can be temporarily restrained or held in its said withdrawn position.

For example, without intending to so limit all features of my invention, I show a block or sleeve 40, located on the bolt 34, between the bushings 38, and normally fixedly secured to the bolt by set screw 41. This block 40, is provided with a rigid laterally projecting arm 42, to which is fixed a slide pin or rod 43, perpendicular to arm 42, and parallel with bolt 34, and slidably confined in a complementary hole in the outer wall of the box or housing 39.

The coiled expansion spring 37, is more or less loosely located on the slide pin 43, and compressed between said outer wall of housing 39, and the outer side of said arm 42, to approximately constantly exert pressure on the bolt 34, forcing the same toward turret locking engagement with the major indexing ring or member.

Manually operated means is provided for withdrawing the bolt 34, from turret locking position and holding the same thus withdrawn, and whereby the bolt can be released and allowed to snap back under the power of spring 37. In this specific embodiment, such means comprises a shaft 44, rotatably mounted in and extending through the top wall of housing 39, and exteriorly provided with accessible operating handle 45, and within said housing rigidly provided with laterally projecting cam 46, having an exteriorly and substantially flattened nose 47. The plane of this cam 46, is perpendicular to the longitudinal axis of the cam shaft 44, and said cam is located in the plane of the arm 42, and in operative relation to said arm.

This cam when in its normal position, is arranged transversely with respect to bolt 34, and slide 43, substantially out of operative contact with lateral arm 42, and the bolt 34, is thus free to remain in and return to its locking position under the action of spring 37.

To retract or withdraw the bolt 34, against the tension of its spring 37, to permit rotary movement of the turret 6, 7, the cam shaft 44, is rotated by its handle 45, in a direction to carry the cam nose 47, into sliding forcing engagement with the lateral arm 42, rigid with bolt 34, and thus force withdrawal movement of the bolt, against the tension of its spring. This forcing rotation of the cam is continued until the bolt 34, has reached its fully withdrawn position, and the cam has reached a position wherein its longitudinal axis is substantially perpendicular to the longitudinal axis of arm 42, and substantially parallel to the bolt 34, and slide pin 43, whereupon cam rotation ceases, and the bolt 34, is thus held locked in withdrawn position. The bolt 34, can then be released for automatic return to turret locking position, by manipulation of handle 45, to start backward rotary movement of the cam toward its said normal position.

In this particular embodiment where the turret locking slide bolt 34, is cylindrical, except at its wedge shaped end 35, the rigid lateral arm 42, and its guiding slide 43, also serve to hold bolt 34, against rotatory movement on its longitudinal axis, and thus maintain the bolt end 35, constantly in position to properly seat in any one of the indexing locking-bolt receiving sockets 32 of the master index disk 31.

The turret having any suitable means, such as a worktable, or a work holding chuck, or other means, fixed to turret face plate 6, and holding the work in the required angular or other position, can be rotated or indexed from socket 32, to socket 32, through 360° by withdrawing and releasing the locking bolt 34, as required, broadly, as is common in this art. During this operation, the work can remain in its originally set position with respect to the turret, and the turret can be propelled on each rotating step, preferably, by hand.

Referring to the organization as so far described, when indexing the turret 6, 7, according to the major uniformly-spaced indexing sockets 32, of the master index disk 31, after each indexing or rotary movement from one socket 32, to the next socket 32, the locking bolt 34, snaps into the last named socket, and the handle 27, is then operated to rigidly clamp the turret spindle 7, against rotary movement and to withstand the thrust of the cutting or boring operation on the work. Preparatory to the next indexing rotary movement, the handle 27, is operated to release the turret spindle for rotation, and the bolt 34, is withdrawn from locking position.

It is sometimes necessary to index work through 360°, where the required indexing steps or stops are not uniformly spaced and/or are less in number than the twenty-four, thirty-six, or other major even number of sockets or divisions, usually provided by a master index disk or member. For instance, it might be desired to provide only 2, 3, 4, 6, 8, or 12 variously spaced sub-indexing points in a rotation through 360°, where the master index member provides a multiple number, such as twenty-four uniformly spaced major stopping points; or only 3, 4, 6, 9, 12, or 18 variously spaced sub-indexing points in a rotation through 360°, where the master index member provides another multiple number, such as thirty-six uniformly spaced stopping points.

Heretofore, it has been proposed, to accomplish this sub-divisional indexing by providing a series of separate selector plates, one for each such required sub-indexing sets. This, of course, requires, say, six separate plates for the above noted sub-divisional sets where the master index member provides twenty-four uniformly spaced major sockets or divisions. These plates must be separately prepared, and maintained together against loss or misplacing. These plates are one at a time or substitutionally secured to the master index member, to so mask all of the major index stations thereof against reception of the locking plunger, except those opposite the sub-divisional set of the particular plate.

This proposal requires removal of one plate, and substitution of another plate, whenever it is necessary to provide for different sub-divisional indexing.

*Selector, setting and controlling means for sub-divisional indexing*

I have in the example embodiments illustrated, provided mechanisms for overcoming, the sub-divisional indexing difficulties hereinbefore described.

For example, the machine embodiment of Fig. 1 includes a preferred type of selector mechanism, wherein a cylindrical sub-divisional selector drum 48, is arranged longitudinally and concentrically of the turret spindle 7, and secured rigidly thereto to rotate therewith. This drum provides a substantially smooth exterior cylindrical circumferential slide or masking surface or surfaces 49, for sliding and hold-back engagement with means for locking the drum in any selected angular position. This surface 49, is longitudinally elongated or of at least the necessary longitudinal length or width to receive the required number of separate annular series of sub-divisional drum locking or indexing sockets 50. Each such series consists of a number of sockets that is a denominator of the total or multiple number of major index sockets 32, carried by the master index member 31.

For example, if there are twenty-four uniformly spaced major index sockets 32, the drum 48, will provide, preferably, six annular series of sub-divisional indexing sockets 50, each series being located in a different plane transversely of the drum than the different, but parallel planes in which the remaining sub-divisional series are located, respectively.

Thus, in the above noted example, there will be an annular series of two sub-divisions or sockets 50, another series of three such sockets, another of four, another of six, another of eight, and another of twelve. See Figs. 3 and 4.

For example, these sub-divisional sockets 50, can be formed by separated holes extending radially through the circumferential wall of the hollow drum. If so desired, each such hole or socket can be in the form of a slot elongated circumferentially of the drum, although such formation is not essential. In this particular instance, the cylindrical drum 48, is formed by the annular cylindrical depending flange of a substantially flat rigid supporting and securing ring 51, of substantially the same external diameter as the flange or drum. The usually flat top face of said ring 51, is centered on and fits the bottom annular surface of the master index ring or disk 31, concentrically with respect to turret spindle 7, and said ring is rigidly secured to said disk 31, in any suitable manner, as by stud bolts or screws 52, passing longitudinally through ring 51, and into longitudinal tapped holes in master disk 31.

Each sub-divisional lock-receiving socket 50, of the drum 48, is in alinement, longitudinally of the turret 6, 7, with some one of the major index lock-receiving sockets 32, of master index disk 31.

If so desired, the circumferential edge portion, of the drum ring 51, can be provided with a surrounding radially projecting sealing ring 53, seated therein and composed of felt or material equivalent for this purpose. This dust guard or seal 53, at its circumference closely fits and rubs against the inner surface of the fixed annular wall 54, of the hollow base, that surrounds the annular space within said base, in which are located the clamp or brake 24, the master index disk 31, and the top portion of ring 51. The purpose of this sealing strip is to exclude dust and the like from said space.

Suitable means are provided, in this example embodiment, for selecting any one of the longitudinal series of sub-indexing sockets 50, of the drum 48, and for permitting indexing rotary movements of said drum and consequently the turret 6, 7, from socket 50, to socket 50, of said selected sub-divisional series through 360°, while in this example, holding back the locking bolt 34, of the master index plate, from operating engagement with all of the master bolt-receiving sockets 32, that are not in alinement with the sub-divisional sockets 50, of said selected sub-divisional series.

The cylindrical drum surface 49, in this example, while concentric with the master index locking bolt receiving sockets 32, is spaced longitudinally therefrom, and is remote from the path of movement of the master index locking bolt 34 and hence said bolt 34, does not enter or directly cooperate with the sub-divisional sockets 50, although the sub-divisional drum 48, is held against rotation when the turret 6, 7, is locked by the major bolt 34, in any one of the master sockets 32.

In this example, the block 40, rigid with the master index locking bolt 34, is formed with a stub journal or cylindrical stud 55, rigid with the block. The longitudinal axis of this stud is parallel with the longitudinal axis of turret 6, 7, and arranged radially of the bolt 34. See Figs. 11, 12 and 13.

A cylindrical selecting wheel or rotor 56, is centered and rotatable on this rigid stud 55, and is retained thereon by suitable means, as for instance by screw 57, screwed into a central tapped longitudinal hole in said stud, with its exterior flat head lapping over the exterior inner side or end face of the rotor 56.

This rotor is carried by the master index locking bolt 34, through the medium of block 40, and stud 55, and is hence movable radially of the turret 6, 7, with said bolt 34, toward and from the turret axis. Rotor 56, is arranged beside drum 48, with its axis parallel with the drum axis, but with the circumferential surface of the rotor, preferably, remote and spaced radially from the circumferential surface of drum 48.

The rotor is, preferably, of substantially the same longitudinal length as the drum, and both the rotor and the drum, are preferably, in a common plane transverse of the axis of the turret 6, 7. The rotor is shown with flat parallel exterior end faces, although this is not essential. This rotor is provided with a plurality of stiff or rigid sub-divisional separated fingers or bolts 58, projecting radially from the circumference of and rigid with said rotor. These fingers are preferably straight and alike in formation and length, and each spaced and separated from the others.

These radial bolts 58, are located at various angular positions around the rotor and in various parallel planes transversely of the rotor. There is a separate bolt 58, for each annular series of sub-divisional sockets 50, in the sub-divisional indexing drum 48, and each bolt 58, is complementary to the sockets 50, of its particular series and no others, and is adapted to have drum locking engagement with the sockets of its own series.

For example, where the drum 48, provides six sub-divisional series of annular sub-divisional slots or sockets 50, arranged in different transverse planes, respectively, extending longitudinally of the drum, the selector rotor 56, is provided with six variously spaced and located fingers or bolts 58, each complementary to the sockets 50, of one of said series, but not to the sockets of the remaining series. The fingers or bolts 58, project radially at various angular positions around the circumference of rotor 56, and each finger 58, is located in a different plane transversely of the rotor than the transverse planes in which the remaining finger series are located, respectively, and these six transverse planes, in which said six separate fingers 58, are individually located, respectively, are common with the six transverse planes in which said six series of sockets 50, are located, respectively. See Figs. 6, 7, and 8.

The selector rotor 56, is in this example, provided with selecting means, whereby the rotor can be conveniently rotated to bring a selected finger 58, into cooperative relation to its particular series of complementary sockets 50, and whereby the rotor can then be temporarily locked in such angular position. For instance, I show, for this purpose a substantially flat disk 59, fixedly secured to rotor 56, as by clamping screws or threaded headed studs 60, and having a central hole receiving and centered by screw head 57. I happen to show this disk 59, with its top or outer side or end face fitting the bottom or inner end face of rotor 56, and centered with respect to the axis thereof. This disk 59, is preferably of such relatively large diameter with respect to rotor 56, as to extend laterally therefrom, beside or under the lower or inner end of drum 48, and also across the otherwise open bottom or side of housing 39 and below and outwardly beyond the depending outer enclosing wall of said housing.

This disk 59, is hence of such large diameter, as to be accessible at its exposed outer rim portion to the hand or fingers, for the purpose of rotating the rotor 56, in either direction. See Figs. 1, 2, and 9.

This projecting exteriorly accessible outer segment of the marginal portion of the selecting dial disk 59, exposes the top surface of said marginal portion and any indicia thereon, and renders the same visible and legible to the operator for his guidance in rotating and setting said dial disk 59.

The outer central portion of said depending enclosing wall of housing 39, provides the confining guideway for a disk-locking plunger 62. This plunger is above and perpendicular to and is constantly spring-pressed toward the top or outer surface of the annular marginal portion of the disk to yieldingly press down thereon and pass into any slot or other plunger receiving formations in the disk. This plunger 62, is provided with a projecting exterior accessible handle 63, by which it can be temporarily elevated from operative locking contact with the disk, to permit disk rotation.

The annular marginal portion of the disk is provided with an annular series of suitably-formed and arranged separate plunger receiving sockets to permit the plunger 62, to spring down into engagement with any one thereof, to temporarily hold the disk against rotation. For instance, such sockets can be formed by an annular series of uniformly-spaced radially-elongated slots 61, each slot 61 extending transversely through the disk and each representing one of the fingers or bolts 58, and no other finger and the particular series of sub-divisional sockets 50, complementary to such particular finger.

Where the rotor is provided with six fingers or bolts 58, the dial and rotor rotating disk 59, will be provided with six slots 61, preferably, plus a similar added slot 61, to represent the number of major locking sockets of the master dial 31.

Each slot 61 is so arranged with respect to the particular finger or bolt 58, represented thereby, that when the rotor 56 s rotated by disk 59, to bring said particular slot 61 into disk-locking engagement with plunger 62, the finger or bolt 58, represented by such slot will radially project from the rotor toward the then stationary drum 48, in the transverse plane that includes the particular set of sockets 50, to which said finger is complementary. Thus when the rotor is released for straight-line radial movement, the spring 37 will drive the rotor radially toward the drum, and bring the free end of said selected finger 58 into operative spring-pressed contact with the masking slide surface 49, of the drum to snap into a socket 50, in the series to which said selected finger belongs, when the drum is rotated.

The dial disk 59 is provided with visible indicia adjacent each slot 61, to identify each such slot with the particular finger 58, and set of sockets 50, that it represents.

For example, where the master index provides twenty-four major indexing divisions, and the sub-indexing drum 48, provides for six different sub-divisional indexing, the dial disk 59, on the top surface of the marginal portion that includes slots 61, can provide clearly visible identifying numbers adjacent each slot. For example, the particular slot 61, that represents the particular finger 58, complementary to the two step sub-divisional series, is shown with the exposed visible numeral 2, beside or adjacent to said slot, and the slot that represents the three step sub-divisional series, has the exposed visible numeral 3, adjacent thereto, and the same is true of the slots adjacent to which appear the numerals 4, 6, 8, and 12, respectively.

The seventh slot, shown in this embodiment, is identified by the numeral 24, the number of indexing steps provided, in this particular example, by the master indexing member.

In this example, this slot 61, identified by the numeral 24, represents an arcuate portion of the circumference of rotor 56, from which no fingers or bolts 58, project, so that when said identified slot registers with and receives the plunger 62, and the rotor is hereby held against rotation, there will be no finger or bolt 58, engaging, locking, or cooperating with the sub-divisional drum 48. Hence, the turret 6, 7, can then be indexed according to the major steps provided by the master indexing means. This is possible, as the sub-divisional rotor 56, and parts carried thereby move radially of the indexing turret, with the master index bolt 34, on its locking and withdrawal operations. The sub-divisional dial 59, when locked against rotation by plunger 62, is free for such radial movements with its rotor 56, because of the radial elongation of the slots 61.

The sub-divisional dial disk 59 is normally in position with its slot 61 (identified by numeral 24), receiving plunger 62, and thereby locked against rotation while free to move radially toward and from the axis of the indexing turret 6, 7, with master index bolt 34, as the sub-divisional indexing selector rotor 56, and its fingers or bolts 50, are then held from operative relation to sub-divisional drum 48, and the organization is then set for indexing according to the master indexing disk or member 31.

When the sub-divisional selector rotor is set and locked as just described, with the sub-divisional indexing means out of operative relation to the sub-divisional indexing drum 48, indexing according to the master indexing member and cooperating parts can be carried on, as hereinbefore described, during which said sub-indexing drum rotates with the indexing turret 6, 7, as an idler, and the sub-indexing rotor and its dial selecting disk move, as an idler, back and forth in a straight line with the bolt 34, radially of the indexing turret.

When it becomes necessary to index work by steps other than those provided for by the master indexing member 31, the master bolt withdrawing lever or handle 45, is swung in the necessary direction to withdraw the master bolt 34, against the tension of spring 37, through the medium of cam 46, and arm 42, which action results in the bolt being temporarily locked in withdrawn position by said cam. This withdrawal of the master bolt 34 automatically causes similar straight line withdrawal of the rotor 56, and its dial member 59, and holding of the same in withdrawn position.

While the bolt 34, and sub-indexing fingers 58, are thus held from operative contact with master disk 31, and sub-divisional drum 48, respectively, the dial locking plunger 62, can be held elevated to free the sub-divisional selecting dial 59, for rotation. This dial is then rotated to bring the desired sub-divisional slot 61 (other than the master indexing slot designated 24) into registration with plunger 62, which is then permitted to enter the selected slot, and thus lock the rotor 56, against rotation. This selective rotation and setting of the dial and its rotor, brings the sub-divisional bolt or finger 58, that is represented by the particular selected slot 61, into operative position projecting radially toward sub-divisional drum 48, in the same transverse plane in which the sub-divisional series of sockets 50, represented by said selected finger 58, is located. Then, the handle 45, can be moved to release the withdrawn master bolt 34, and the rotor 56, whereupon the spring 37, will simultaneously move the master bolt into operative contact with master dial 31, and the selected set finger 58, into operative contact with the selected annular circumferential portion of sub-divisional drum 48.

As each socket 50, of the drum 48, is in alinement with some one of the major sockets 32 of master index member 31, whenever a sub-divisional finger or bolt 58, snaps into a socket 50, the major bolt 34, will simultaneously snap into a master index socket 32. Also, whenever a sub-divisional finger 58, abuts and slides on the masking smooth circumferential surface 49, intervening sub-divisional sockets 50, of a series, during turret indexing rotation, both the master bolt 34, and the rotor 56, will be thereby held back under the tension of spring 37, and the bolt 34, will snap into a master socket 32, at the same time that the particular finger 58, reaches and snaps into a sub-divisional socket 50. Thus the exterior surface of the sub-divisional drum 48, intervening between the sockets 50, of any annular series serves as a mask to hold back the master bolt 34, from all master sockets 32, except from those sockets 32, that are in alinement with the sockets 50, of the particular selected sub-divisional annular series.

After the rotor 56, has been rotated and set to select the particular sub-divisional series desired, the sub-indexing rotary movements of the turret can be carried on by the method hereinbefore described for sub-divisional indexing.

While in this example I show a preferred embodiment wherein the rotor 56 is in the form of a one-piece ring or cylinder with the locking fingers or bolts 58, rigid therewith and projecting from the circumference thereof, yet I do not wish to so limit my invention, as various other forms and constructions can be employed for selecting the desired series for sub-divisional indexing.

Also, while this example shows a preferred specific embodiment of means rotating with the spindle 6, 7, and provided with the spaced circular relatively fixed series of different sub-divisional stops or sockets, yet I do not wish to so limit my invention, as various other arrangements or means can be employed to carry such different series of sub-divisional stops.

For instance, in Fig. 15, I show a sub-divisional indexing drum 48a, that can be employed instead of the cylinder or longitudinal flange 48, with its several series of sub-divisional stops or sockets in the form of radial holes 50. This drum 48a, comprises an assembly of separately made flat, disk-like circular rings 48b, rigidly secured together with their side or end faces contacting, to form the hollow cylindrical drum. The disks are, preferably, all duplicates or similar in dimensions, both radially and longitudinally, and differ only with respect to the locations and number of the sub-divisional sockets or stop notches 50a, radially opening through the circumferential surfaces of the disks. Thus, each cyindrical disk or ring has a circular set of sub-divisional indexing sockets or stop notches, different from the circular sets of sub-divisional indexing sockets of the remaining rings, either with respect to the number of such sockets and/or in the angular spacing thereof. These previously made rings, similar except as to socket arrangements, are then assembled and fixed together against relative movements, to provide the cylindrical drum 48a, fixed to indexing turret 6, 7, concentrically to the axis thereof, and to rotate with said turret.

The rings 48b, can be fixedly secured together by rivets or otherwise and also fixed or secured to master dial plate 31, by such rivets or other means. For instance, the assembly of rings 48b, can be fixed to a suitable holder, such as rigid ring 48c, as by countersunk longitudinal rivets 48d, extending transversely through rings 48b, and 48c.

The ring 48c, carrying the rings 48b, is secured to the inner face of the master index member 31, by any suitable means, for example, by bolts 36, and centering studs 36a. The rigid holder ring 48c, can be formed with a rigid inwardly extending intermediate cylindrical longitudinal flange 48e, backing and centering the drum 48a, of sub-divisional rings 48b.

Each sub-divisional ring 48b, is formed with one or more transverse rivet holes for the rivets 48d, and these holes serve to properly locate relative angular positions of the respective radial sub-divisional index notches 50a, in the circumference of each disk. As in the previously described example of Fig. 1, all of the notches 50a, of the laminated drum 48a, are in longitudinal alinement with one or more of the major indexing notches or stops 32, of the master dial 31. Thus the flattened out circumference of drum 48a, will show notches 50a, corresponding to the showing of Fig. 3. Each disk 48b, provides a cylindrical circumferential slide surface that is interrupted only by the several sub-divisional socket-forming indexing notches 50a, of the particular ring, hence the drum 48a, like the drum 48, of the organization of Fig. 1, provides an exterior cylindrical circumferential surface wherein each circular set of sub-divisional sockets 50a, is located in a transverse plane separate from and parallel with the other circular sets of the series carried by the drum.

Also, where the master index provides a circular set of twenty-four equally spaced major index stops or sockets 32, each sub-divisional ring 48b, will provide a number of sub-divisional stops or sockets 50a, that is a denominator of twenty-four and that differs from the sets of sub-divisional stops carried by the other rings 48b.

Thus, the sub-divisional drum 48a, can be substituted in the organization of Fig. 1 for the sub-divisional drum 48, thereof, and the operations of master indexing as well as sub-divisional indexing can be carried on as hereinbefore explained in connection with the machine of Fig. 1.

The sub-divisional selector and locking rotor 56, 58, of the machine of Fig. 1, can be employed in cooperation with the sub-divisional drum 48a, when substituted for the drum 48, of the machine of Fig. 1, or with any other form of sub-divisional indexing member, within the spirit and scope of this invention.

Various other constructions of sub-divisional selector and locking rotor can be employed in place of the construction 56, 58, of the machine of Fig. 1.

For instance in Fig. 15, I show a rotor 56a, of laminated structure. This last named rotor comprises an assembly of parallel preformed flat rings or disks 56b, rigidly secured together by any suitable means or method, for example, by one or more rivets 56c, extending longitudinally of the rotor through alined transverse holes in the disks with the rivet ends countersunk in the opposite ends of the rotor. These preformed separately made rings 56a, are each provided with one stiff locking bolt or finger 58a, rigid therewith and projecting radially therefrom in the plane of its respective ring. These rings are all duplicates, except as to angular positions of said fingers.

Thus a ring 56b, and its locking finger are provided for each circular set or series of sub-divisional sockets or stops 50, or 50a, of the sub-divisional indexing drum 48 or 48a, of the organizations hereinbefore described. The arrangement of fingers 58a, is the same as disclosed by Figs. 6–8.

For instance, the fingers 58a, correspond to and are arranged the same as the fingers 58, of the machine of Fig. 1, where the instant rotor 56a, is formed to cooperate with sub-divisional drum 48, and its sub-divisional sockets 50. The description of the operation of rotor 56, and its fingers 58, in co-operation with drum 48, and its sockets 50, applies where the instant rotor 56a, is employed in the organization of Fig. 1, instead of the rotor 56, thereof. The same is true where the instant rotor 56a, is complementary to and employed in cooperation with the sub-indexing drum 48a, and its sockets 50a.

In Figs. 16 and 17 I show modified structures of sub-divisional drum and cooperating selector and locking rotor, that can be employed instead of drum 48, and selector and locking rotor 56, of the machine of Fig. 1. In this modification, the sub-divisional drum 48g, rigid and concentric with the indexing turret 6, 7, of Fig. 1, is in the form of a strong exteriorly cylindrical ring that is L-shape in radial section, with its transverse circular flange 48h, fitting the inner side surface of master dial plate 31, and rigidly secured thereto by any suitable method or means, for instance, such as bolts 52g.

The exterior cylindrical surface of the longitudinally elongated drum 48g, is provided with the spaced series of different circular sets of sub-divisional indexing stops or sockets 50g, that correspond to and can be arranged the same as the sockets 50, of the machine of Fig. 1.

In the instant modification, each socket 50g, is arranged radially and opens through the otherwise smooth exterior slide surface of the cylinder, and extends but part way through the radial thickness of cylinder 48g.

In the instant modification, I show a selector and locking rotor that comprises a hollow substantially one-piece cylindrical hub 56g, rotatably mounted on and confined to the journal 55, and having the radially projecting locking bolts or fingers 58g, in the form of pins driven or otherwise fixed in radial sockets drilled or otherwise formed in the hub 56g. These pins 58g, are arranged the same as are the bolts or fingers 58, of the machine of Fig. 1, to cooperate with the sockets 50g, of the drum 48g.

We show the instant modification applied to the machine of Fig. 1, in place of its drum 48, and rotor 56, 58. The description and illustrations of the arrangements of the sub-divisional stops or sockets 50, and the fingers or bolts 58, of the machine of Fig. 1, and the functions performed thereby, and the method of operating the same, also apply to the various modified forms of sub-division indexing drums and selectors and locking rotors, so far described, and illustrated by Figs. 15–17.

My instant invention also includes an organization such as diagrammatically illustrated by Figs. 18, 19, and 20, wherein the master indexing locking bolt or plunger and the sub-divisional selector and locking bolt are both confined to straight-line paths of movement that are parallel with the longitudinal axis of the indexing turret 6, 7, instead of radially of said turret axis, and wherein the master indexing sockets or stops and the sub-divisional indexing sockets or stops are also arranged longitudinally of the indexing turret, instead of radially with respect thereto.

This modified machine, in this example thereof, can include the hollow base 1, having the rigid annulus 2, providing the frusto-conical or tapered bearing surface 3, as hereinbefore described.

The indexing work-carrying turret can include the face plate 6, and the spindle 7, secured to said plate 6, and provided with the conical or tapered portion 8, and suitable locking and releasing clamp means, for instance split spring ring 24, all as hereinbefore described.

In this modification, some transverse disk-like or other part normally rigid and rotating with the indexing turret, is provided with the circular series of twenty-four, for instance, uniformly spaced master indexing sockets or stops 32a, concentric with the turret axis, with each such socket 32a, longitudinally arranged with respect to said indexing turret, i. e., the parallel longitudinal axes of these sockets 32a, are parallel with the longitudinal axis of the turret 6, 7.

Instead of employing a separate master index disk 31, added to the turret 6, 7, to carry the master sockets 32, as shown in the preceding drawing figures, I utilize the turret face plate 6, to carry the master index stops or sockets 32a, as such plate is a strong rigid part of the sturdy turret that includes spindle 7.

Thus, these sockets 32a, are, in this example, drilled or otherwise formed transversely of said plate to open downwardly or inwardly through the flat inner or bottom side face of the plate. The sockets thus extend upwardly or outwardly of the plate and longitudinally of the turret, and the series of sockets, extends through 360°, forming a circle concentric with the turret axis of any suitable diameter.

A single master locking bolt or plunger 34b, is mounted in the base 1, to cooperate with said sockets 32a, one by one, in locking the turret at any desired indexing station and for releasing the turret for indexing rotation from station to station.

In the example shown, this bolt is mounted for straight line sliding reciprocation in a confining slideway 2x, extending longitudinally through the rigid annular portion 2, of the base, and the top and bottom or inner and outer faces thereof.

The downwardly opening sockets 32a, in the bottom of face plate 6, are brought one by one into registration with the upper end of slideway 2x, as the indexing turret is rotatably indexed, and the bottom face of said plate 6, forms slide surfaces between the sockets 32a, against which the bolt 34b, bears and by which it is held back during turret indexing rotation. The upper locking end of the bolt 34b, is suitably formed to enter the series of similar sockets, one by one, and lock the face plate at each indexing stop. As hereinafter explained, the bolt 34b, is provided with means for withdrawing the bolt downwardly from locking engagement with any socket 32a, against spring tension acting to press the bolt upwardly into engagement with the face plate.

Any suitable means can be provided for withdrawing said bolt and for moving the same to locking position. For example, I show the lower portion of the bolt formed with a toothed longitudinal rack 34c, operatively engaged by a complementary toothed pinion 34d, normally fixed to a transverse shaft 34e, rotatably mounted in the exterior wall of the base 1, and extending to the exterior thereof and provided with an exterior accessible rotating handle 34f, by which the pinion can be rotated in either direction to withdraw or to project the bolt 34b.

In this particular example, the several series of circular sets of sub-divisional indexing sockets 50h, are carried by and formed in a usually circular drum or ring-like flat disk 68i, arranged transversely of and centered on the lower end of spindle 7, and secured against the lower end of spindle taper 8, by suitable means, such as one or more bolts or screws 60.

These sub-divisional indexing sockets 50h, all extend transversely through or partially through the ring 48i, and the longitudinal axes of said sockets are all parallel with the longitudinal axis of the indexing turret, and with the master indexing sockets 32a, in the turret face plate 6.

Each circular set of sub-divisional longitudinal sockets 50h, is concentric with the indexing turret axis, and the sets form a series of spaced concentric circles that increase outwardly in diameter step by step from the innermost circle to the outermost circle.

Where the master index provides twenty-four uniformly spaced sockets 32a through 360°, I preferably provide, say, six sets or spaced circles of sub-divisional sockets 50h, one circular set providing two sockets 50h, another three sockets 50h, another four such sockets, another six, another eight, and another twelve, although I do not wish to so limit my invention. Each sub-divisional socket 50h, of said several sets, is in this example, in the same longitudinal radial plane with some one of the master indexing sockets 32a.

The bottom face of the sub-index member 48i, provides smooth slide surfaces between the sub-divisional sockets 50h, of each circular set of such sockets.

Sub-divisional selector and locking means are provided operating in conjunction with master bolt 34b, for sub-divisional indexing of the turret 6, 7. For instance, I show a strong stiff guide plate 66, rigidly secured to the master plunger 34b, and projecting radially therefrom toward and radially with respect to the axis of the turret 6, 7. This guide plate extends radially across and in substantially close proximity to the under or inner flat face of the sub-divisional indexing drum or disk 48i. This guide plate is of yoke-like formation to provide a longitudinally elongated parallel-side walled slideway or slot 67, closed at both ends and in length usually slightly longer than the radial length of the member 48i, in which the several circular sets of sockets 50h are located.

A sub-divisional indexing selector and locking plunger 68, having a reduced locking bolt end 69, adapted to enter any one of the sub-divisional sockets 50h, in member 48i, in operative locking engagement to temporarily hold the turret against indexing rotation.

This plunger 68, provides an annular stop shoulder 70, to abut the inner or under surface of the rigid guide yoke 66, and with an intermediate longitudinal guide portion 71, located between shoulder 70, and the locking bolt end 69. This portion 70, slidably fits in the longitudinal slot 67, to guide and maintain the bolt end 69, in operative position with respect to the sockets 50h.

This plunger 68, is carried by a guide head 72, and is longitudinally slidable through said head toward and from the sub-divisional member 48i. The head 72, is formed with a guideway extending transversely therethrough in which said plunger is slidably confined for straight-line reciprocation. The head 72, is fixed to and carried by a stiff strong elongated slide bar 73, arranged radially with respect to the longitudinal axis of turret 6, 7, and longitudinally movable through an exterior wall of base 1, toward and from said axis. Said wall of the base, provides a slideway through which bar 73, extends to the exterior of said base and by which the bar is supported and held to endwise longitudinal straight-line sliding movement. The bar 73, at the exterior of the base, is provided with an accessible handle 74, by which the bar can be forced inwardly or pulled outwardly.

The head 68, of slide bar 73, holds the plunger 68, in alinement with any one of the circular sets of sockets 50h, to slip into any one of said sockets and to be held back by the slide surface intervening between said sockets. By longitudinal sliding movement of slide bar 73, the plunger 68, when in withdrawn position can be moved radially of the turret 6, 7, and longitudinally of the guide yoke 66, to bring the bolt end 69, of said plunger into operative alinement with the selected circular set of sockets 50h. Hence, the exterior portion of said slide bar is provided with an exteriorly visible longitudinal scale marked, for instance, 2, 3, 4, 6, 8, 12, to indicate the position to which the bar shall be moved to bring the plunger 68, into operative position for the corresponding set of sub-divisional sockets 50h. The bar 73, can be temporarily held at the desired position by a spring-pressed ball detent 75, in the base wall and complementary notches 76, in the bar.

Suitable spring means 77, 78, and 79, is provided to yieldingly press the plunger 68, longitudinally toward the sub-divisional index member 48i, and the master plunger 34b, toward the inner side face of face plate 6.

The longitudinally sliding sub-divisional plunger 68, is thus under constant spring-pressure to hold its bolt end 69, in a socket 50h, or against the surface of member 48i, and the shoulder 70, of plunger 68, exerts upward or outer pressure against yoke 67, to press the master bolt 34b upwardly or outwardly against face plate 6.

When sub-divisional indexing is to be carried on, the handle 34f, is rotated to withdraw the master bolt downwardly from locking engagement with a socket 32a, of the face plate 6. This withdrawal movement of the master plunger forces the yoke 66, downwardly or inwardly against the tension of springs 77, and also forces the sub-divisional plunger 68, downwardly or inwardly from operative engagement with a socket 50h, against the tension of springs 77. Then while plungers 34b, and 68, are held withdrawn, the turret 6, 7, is a short distance to move the socket 32a, out of alinement with plunger 34b, and the socket 50h, out of alinement with plunger 68. Thus, while said plungers are held withdrawn, the slide rod 73, can be longitudinally moved and set according to indicating scale to bring the plunger 68, into alinement with the selected particular circular set of sockets 50h, desired for the particular sub-divisional indexing work to be carried on.

When the plunger 68, has thus been adjusted and set for the selected sub-divisional circular set of sockets 50h, the turret 6, 7, can be rotated until the plunger 68, snaps into one of the sockets 50h, of the selected set, and the master plunger snaps into a socket 32a, both under the tension of springs 77. Thereupon the sub-divisional indexing can proceed through 360°, as hereinbefore explained in connection with previously described constructions of my invention.

In this connection, it should be noted that whenever the sub-divisional plunger 68, is out of alinement with all of the sub-divisional sockets 50h, the master plunger 34b, will be out of alinement with all the master sockets 34b, and said plungers will be in alinement with or bearing against, one with the slide surface between sockets 32a, and the other with the slide surface between sockets 50h. Hence, whenever sub-divisional plunger 68, is in operative alinement with any one of the sub-divisional sockets 50h, the master plunger will be in operative alinement with one of the master sockets 32a.

Figs. 21-23

Where the indexing head provides a member rotating with the rotary indexing turret, and provided with several circular concentric spaced sets of differently arranged indexing stops or sockets according to my instant invention, my said invention comprehends the employment of a single removable and applicable bolt for selecting any one of said circular sets of sockets and for locking cooperation with the sockets thereof one by one.

For example, Figs. 21, 22, and 23, disclose a removable and applicable selector and locking bolt 80, in this example, removably carried by the master indexing bolt 34, and removably and temporarily applicable to any one of the several circular sets of sockets 50g, carried by the cylindrical drum 48g, secured to and rotating with the indexing turret 6, 7.

Apart from the bolt 80, and its mountings, the indexing head of Figs. 21-23, is substantially the same as that disclosed by Figs. 16 and 17, although I do not wish to so limit, the instant modification as the bolt 80 and its mountings can be adapted to any one of the sub-divisional indexing drums or members hereinbefore described. in place of the sub-divisional selector and locking means employed in connection therewith.

In the instant modification, I show the block 40, fixed to and carried by the master bolt or plunger 34, provided with a strong arm 81, rigid therewith and depending therefrom in the plane of the longitudinal axis of bolt 34. This supporting arm 81, is parallel to the longitudinal axis of turret 6, 7, and is spaced laterally a suitable distance from the circumference of drum 48g. The arm 81, is formed with a longitudinal series of parallel transverse holes 82, each arranged radially with respect to drum 48g, and each in the transverse plane of a circular set of sub-divisional sockets 50g. Thus, if there are six series of sets of sockets 50g, for example, there will be six holes 82. If so desired, each hole can be internally screw threaded longitudinally. Thus, the bolt can be removably inserted through any one of the holes 82, and will be thereby guided into operative engagement with the set of sockets 50g, and the intervening surface of drum 48g, represented by such hole 82. In the particular example illustrated, the usually straight longitudinally elongated bolt 80, provides a smooth-surface cylindrical drum-surface abutting and socket entering locking end 80a, usually but not necessarily of reduced diameter, an intermediate longitudinally screw threaded portion 80b, complementary to any one of the holes 82, an annular stop shoulder 80c, and an exterior end handle 80d, with the bolt length between shoulder 80c, and handle 80d, preferably exteriorly cylindrical.

Preferably, but not necessarily, a rigid wall 83, of the hollow base 1, intervenes between the circumference of the drum 48g, and the bolt supporting arm 81, carried by the master bolt 34. Where employed, this wall is pierced by smooth-surface bolt guiding holes 83a, alined with the holes 82, respectively, and also located in the transverse planes of the circular sets of sockets 50g. Thus, when the bolt 80, is inserted through any one of the holes 82, it will enter and be guided by the corresponding hole 83a, through which it extends into operative relation to drum 48g, and the selected set of sockets 50g.

The portion of the rigid outer enclosing wall 39, of the hollow base 1, opposite the bolt supporting arm 81, has a vertically elongated slot extending therethrough that provides, in effect, a vertical series of transverse holes or passages 84, through any one of which the bolt 80, can be threaded to enter any one of the sets of alined holes 82, and 83a. For example, where there are six spaced circular sets of sockets 50g, in the drum 48g, there will be six of the exterior bolt passages 84.

As each passage or hole 84, represents a particular circular set of indexing sockets 50g, the base wall 39, exteriorly provides a visible scale 85, adjacent to said holes 84, as shown by Fig. 23, wherein the bolt 80, is located in the hole 84, and hence has selected the circular sub-divisional indexing set that has twelve sockets 50g.

In this particular example, the sub-divisional bolt 80, is carried by the master bolt 34, and hence whenever the bolt 34, reciprocates radially with respect to turret 6, 7, the bolt 80, is carried therewith on its straight-line longitudinal movements sliding in the holes 83a, and 84.

The spring means 37, etc., constantly acts to press the master bolt 34 into engagement with master dial 31, and hence also constantly acts to press the sub-divisional bolt 80, into operative contact with the circumferential surface of drum 48g, and hence after the bolt 80, has selected the desired circular set of sockets 50g, and is located in operative position, see Fig. 22, the sub-divisional indexing can proceed as described in connection with the indexing head of Fig. 1. When the head is to be employed for master indexing, the bolt 80, can be removed, or if in position carried by arm 81, can be unscrewed outwardly a sufficient distance to withdraw its bolt end 80a, outwardly into wall 83, from operative relation to drum 48g.

Figs. 24-27

The above mentioned drawing figures in effect illustrate the same indexing head of my invention as that disclosed by Figs. 1-4, with the exception of the controlling and actuating means for the master bolt or plunger 34, and the sub-divisional indexing selector and locking means.

Figs. 24-27 disclose different means than what is disclosed by previously described constructions, for controlling and actuating the master indexing plunger or bolt 34. In the instant modification, said non-rotatable usually cylindrical elongated bolt having the wedge-like inner end complementary to the sockets 32, of the master dial 31, is mounted for slidable reciprocation in a hollow projecting boss 86, integral with the exterior enclosing wall 39a, of the hollow base 1. This boss provides a projecting neck open at its outer end and interiorly screw threaded. A hollow threaded plug 87, is screwed into said neck to close the outer end thereof and to provide a smooth exterior abutment surface 87a.

The straight elongated bolt 34, extends outwardly through the base wall, said neck, and said plug with its outer end projecting beyond the plug. Within the base wall, the bolt slidably fits within hard bushing 38 which is held in position by pin 88, if required.

The bolt 34, is under constant spring pressure toward the master dial 31, under the action of coiled expansion spring 37a, located on the bolt and compressed between plug 87, and the projecting cross pin 89, fixed to the bolt and holding the bolt against rotatory movement on its longitudinal axis. For this purpose, the pin ends fit and travel with the bolt, in longitudinal grooves in the walls of the bore of said neck or boss 86.

The bolt 34, is withdrawn from operative engagement with master dial 31, and against the tension of spring 37a, by any suitable cam means. For example, I loosely mount a cam sleeve 90, on the projecting outer end of cylindrical bolt or plunger 34, for relative rotatable movement. The inner end of this sleeve preferably provides a flat end face abutting and slidably engaging the outer end face 87a, of plug 87. This sleeve is provided with any suitable means whereby the sleeve can be subjected to rotary movements in either direction on said plunger. For instance, I show exterior radially projecting handle 91, for this purpose. The sleeve is formed with a cylindrical concentric bore 90a, of enlarged diameter opening through the outer end of the sleeve and through a portion of the sleeve length. This enlarged bore portion more or less snugly receives a sleeve 96x, fixed to the plunger or bolt 34, by a rigid cross pin 94, having at least one of its rigid ends projecting radially into a spirally arranged arcuate cam groove or slot 95x, in the cam sleeve 90, which has bearing on and rotatably surrounds said fixed sleeve 96x.

The cam slot 95x, extends circumferentially of sleeve 90, along spiral lines, and is of such shape and formation, that when the sleeve 90, is rotated in one direction by its handle 91, or otherwise, the bolt 34, will be propelled inwardly through the medium of spring 37a, and pin 94, toward locking position. When the sleeve 90, is forcibly rotated in the opposite direction the bolt 34, will be withdrawn outwardly from locking position against the tension of spring 37a, and will be thus held, as the cam groove 95x, and pin 94, constitute a self-locking screw organization. When the sleeve 90, is rotatably moved in the opposite direction said lock will be released and the spring 37a, will snap the bolt inwardly toward locking position.

In the previously described constructions of my invention, I show indexing heads wherein the subdivisional selector and locking means move to and from operative positions with and in the same direction as the master indexing bolt or plunger, under or against spring tension; in some of said described indexing heads of my invention, the sub-divisional selector and locking means are carried and held by the master bolt; in some of said heads, the sub-divisional selector and locking means include a separate sub-locking bolt for each of the circular sets of sub-divisional indexing stops or sockets; in certain other of said described heads of my invention, I provide sub-divisional index selector and locking means that include but a single selector and locking bolt that is common to all of the circular sets of sub-divisional sockets; and in Figs. 22 and 23, I show an indexing head of this invention wherein the sub-divisional selector and locking means provides but a single sub-divisional selector and locking bolt that is removable and applicable by hand for selecting and setting purposes, although normally carried by and moving with the master bolt, for turret locking and releasing purposes.

In Figs. 24 and 25, I show selector and locking means for an indexing drum carried by and rotating with the indexing turret 6, 7, and provided with a series of different spaced circular sets of indexing sockets, wherein such selector and locking means consists of a single removable and applicable hand manipulated bolt common, one at a time, to all of said sets of sockets, in selecting the desired set of sockets for indexing purposes, whether or not the particular indexing head includes the master index dial 31, and the cooperating master plunger or bolt 34.

In the instant modification, the indexing turret 6, 7, is provided with a longitudinal indexing drum 95, preferably having a smooth exterior cylindrical surface concentric with the turret axis. This drum is normally fixed to the turret, as by one or more bolts 36, or any other suitable means. This drum is provided with a suitable number, six for example, of spaced separate and different circular sets of indexing sockets or holes 96, for instance, located and arranged as shown by Figs. 2, 3, and 4.

The selector and locking means for the socket series of the drum 95, consists of a removable and applicable hand manipulated selecting and locking bolt 97, and an exterior portion of the exterior rigid wall 39a, of the hollow base 1, having a vertical series of transverse bolt receiving and guiding holes 98. The drum 95, is located behind the base wall portion 39a, that provides the series of bolt holes 98, and more or less closely thereto.

The holes 98, are alined with or in the same planes as the circular rows of indexing sockets 96, respectively, so that each hole 98, identifies and represents its own particular set of sockets 96. Hence, I prefer to provide the series of holes with an exterior indicating and guiding scale 99. This scale provides beside each hole 98, a visible number that indicates the number of indexing sockets in the particular circular set represented by the particular hole. For instance, where the indexing drum provides six spaced series of circular sets of sockets 96, there will be six holes, as described in connection with Fig. 23 of the drawings.

The single selector and locking bolt 97, is preferably straight and longitudinally elongated with a handle 97a, at its outer end, and a reduced socket-entering locking inner end 97b, with the intermediate length smooth and usually cylindrical.

The selector slide bolt 97, can be inserted in any one of the guiding holes 98, and pushed therethrough until its locking end 97, abuts the surface of the drum at the level or in the plane of the selected circular set of sockets 96, then while the bolt is pressed by hand against the exterior slide surface of the drum, the indexing turret can be rotated until the bolt slips into one of the sockets of said set and thus locks the drum. The turret is then locked rigidly by a suitable clamp, such as spring ring 24. When the working operation at that index stop is completed, the bolt 97, is pulled outwardly the slight distance necessary to clear bolt end 97b, from the indexing socket, and the turret is then again rotated while the bolt 97, is pressed inwardly by the hand to hold bolt end 97b, against the slide surface of the indexing drum, until bolt end 97b, snaps into the next indexing socket and stops the turret rotation, for the next working operation.

Where the indexing head of the instant organization, includes a master indexing dial and a complementary spring-pressed master bolt or plunger, said plunger is held withdrawn by its cam or other device, while the turret is rotatably moved on an indexing step with the selector bolt

97, pressed by hand against the surface of the indexing drum. When the pin slips into the next indexing socket, the master spring-pressed plunger is released by movement of its controlling cam or other means, and immediately snaps into a socket of the master dial.

Various different examples of embodiments of my instant invention have been illustrated for purposes of explanation but the inventive concept upon which the instant disclosures are based is more comprehensive than the examples described, and hence I intend no limitations other than those imposed by the claims standing in the case.

What I claim is:

1. In an indexing head that includes a base, a work-carrying indexing turret rotatably mounted to said base and provided with a master indexing dial having a multiple number of uniformly spaced major indexing stops extending through 360°, and a master locking bolt complementary to said stops one by one; sub-divisional indexing means for said turret comprising a series of different concentric spaced-apart circular sets of sub-divisional indexing stops, all of said sets being carried by a part rotating with said turret and being relatively fixed with respect thereto and each other, each set composed of a number of stops that is a denominator of the number of said major indexing stops, each of said sub-divisional stops being located in the same plane radially of said turret as some one of said major indexing stops, and sub-divisional set selector and locking means complementary to said sub-divisional sets and the sub-divisional stops thereof.

2. In an indexing head that includes a base, a work-carrying indexing turret rotatably mounted to said base and provided with a master indexing dial having a multiple number of uniformly spaced major indexing stops extending through 360°, and a master locking bolt complementary to said stops one by one; sub-divisional indexing means for said turret comprising a series of different concentric spaced-apart circular sets of sub-divisional indexing stops, all of said sets being carried by a part rotating with said turret and being relatively fixed with respect thereto and each other, each set composed of a number of stops that is a denominator of the number of said major indexing stops, each of said sub-divisional stops being located in the same plane radially of said turret as some one of said major indexing stops, and sub-divisional set selector and locking means complementary to said sub-divisional sets and the sub-divisional stops thereof, said sub-divisional set selector and locking means being operatively coupled with said master locking bolt to operatively move therewith toward and from operative positions, and to temporarily hold said bolt in withdrawn position.

3. An indexing head comprising a base, a work holder indexing turret rotatably mounted to said base, said turret including a concentric part rotating therewith and providing a circular series of master indexing stops, a master bolt movable toward and from operative relation to said master stops, and sub-divisional indexing mechanism for said turret comprising a sub-divisional unit fixed to said turret and provided with a series of spaced different concentric sets of sub-divisional indexing sockets with intervening exterior slide surfaces, said sets and the sockets thereof being relatively fixed with respect to said surfaces, and sub-divisional indexing selector and bolt means complementary to any one of said sets and the sockets thereof, said selector and bolt means being movable to select any one of said sets for sub-divisional indexing according to the sockets of the selected set.

4. In an indexing head of the type having a base and an indexing turret rotatably mounted to said base for carrying a work holder, with said head provided with master indexing means including a circular series of uniformly-spaced major indexing stops rotating with said turret, and turret locking and releasing means mounted to the base and separately complementary to each of said major stops; the provision of added selective sub-divisional indexing means for said turret comprising a part rotating with said turret and provided with a series of spaced-apart circular sets of sub-divisional turret-indexing stops, said sub-divisional sets being fixed with respect to each other and said part carrying the same and concentric with the axis of rotation of said turret, and added selector lock and release means common to all of said sets for selecting any one of said sub-divisional sets and operatively cooperating one at a time with the stops thereof in stopping and releasing said rotary turret for sub-divisional indexing according to the selected sub-divisional set.

5. In an indexing head of the type having a base and an indexing turret rotatably mounted to said base for carrying a work holder, with said head provided with master indexing means including a circular series of uniformly-spaced major indexing bolt-receiving sockets rotating with said turret, and a turret locking and releasing means complementary to said major sockets; the provision of added selective sub-divisional indexing means for said turret comprising a part rotating with said turret and provided with several different sets of sub-divisional bolt-receiving sockets fixedly-located with respect to each other, all of said sets being concentric with the axis of rotation of said turret and each differing from the other sets in socket spacing and number of sockets, each socket of said several sets being alined with some socket of said major series, said sub-divisional sets being located in adjacent parallel planes, and added selector locking and releasing bolt means for selecting any one of said sub-divisional sets for sub-divisional turret indexing, said sub-divisional bolt means being complementary to said several sub-divisional sets and to the sockets thereof.

6. In an indexing head of the type having an indexing turret for carrying a work holder and mounted for indexing rotation and provided with master indexing means providing a circle of major indexing lock-receiving sockets, and turret locking and releasing means complementary to said major sockets; the provision of selective sub-divisional indexing means for said rotary turret comprising a sub-divisional indexing drum rotating with said turret and provided with several separate spaced circular sets of subdivisional indexing lock-receiving sockets, each such set being different from the others, and added selector and locking and releasing means complementary to said several sub-divisional sets and movable to select any one of said sub-divisional sets and to move to and from locking engagement with the sub-divisional sockets of the selected set.

7. In an indexing head of the type having a work-holder-carrying indexing turret rotatably mounted to a base and provided with a circle of uniformly-spaced master indexing sockets and movable means adapted to cooperate with said sockets one by one in locking and releasing said turret; added sub-divisional indexing means comprising a sub-divisional indexing member fixed to and rotating with said turret and provided with several different circular sets of sub-divisional indexing sockets, each socket of each sub-divisional set being in alinement with a master socket, and movable sub-divisional set selector and locking and releasing means complementary to said several sub-divisional sets and to the sockets thereof, for selecting any one of said sets for sub-divisional indexing according to the number and spacing of the sockets thereof.

8. In an indexing head of the type having a work holder carrying turret mounted to a base for indexing rotation and provided with master indexing means; sub-divisional indexing means comprising a series of separated circular sets of sub-divisional indexing bolt receiving sockets fixedly located on said turret concentric with the axis of turret rotation, said turret providing exterior slide surfaces between the sockets of each sub-divisional set, and sub-divisional indexing selector and bolt means complementary to said sets and the sockets and slide surfaces thereof, and movable to select any one of said sets for sub-divisional turret indexing according to the sockets of the selected set.

9. An indexing head comprising a base; a work-holder carrying turret mounted to said base for indexing rotation and provided with a concentric circular series of spaced master indexing stops and slide surfaces intervening between said stops; retractable master indexing locking means complementary to said stops and slide surfaces and normally spring-pressed toward the same; and sub-divisional indexing means including several differing separate concentric circular sets of sub-divisional indexing stops and intervening slide surfaces rigid with said turret and operatively remote from said master locking means, retractable sub-divisional set-selecting and locking indexing means complementary to said sets of sub-divisional indexing stops and intervening slide surfaces and normally spring-pressed toward any selected one of said sets of sub-divisional stops and slide surfaces, and connecting means operatively securing said master locking means to said sub-divisional locking means to cause both said locking means to move together on their operative and retracting movements, and for holding said master locking means back from operative engagement with said master indexing stops when said sub-divisional locking means is held back by engagement with an intervening slide surface between sub-divisional indexing stops of any one of said sets.

10. In an indexing head of the type having a work-holder-carrying turret mounted to a base for indexing rotary movements, and provided with master indexing means; and sub-divisional indexing means for said turret including series of differing separated circular sets of sub-divisional bolt-receiving indexing stops concentric with and fixedly carried by said turret, and sub-divisional selector and locking-bolt means complementary to said sets and the stops thereof and normally spring-pressed toward the selected set, said sub-divisional selector comprising a rotor carrying said bolt means, and rotatable to select the sub-divisional set for sub-divisional indexing, means for rotating and setting said rotor, and a visible scale indicating the angular positions of the rotor for selecting said sub-divisional sets, respectively.

11. An indexing head comprising a base; a work-holder-carrying turret mounted to said base for indexing rotation and provided with a concentric circular series of spaced master indexing stops and slide surfaces intervening between said stops; retractable master indexing locking means complementary to said stops and slide surfaces and normally spring-pressed toward the same; and sub-divisional indexing means including several differing separate circular sets of sub-divisional indexing stops and intervening slide surfaces rigid with said turret, retractable sub-divisional indexing set selector and turret-locking means carried by and moving with said master indexing locking means, and a visible scale of indicia identifying said sub-divisional sets, respectively, and the required positioning of said sub-divisional locking means for selecting any one of said sets for indexing in accordance therewith.

12. An indexing head comprising a base; a work-holder-carrying turret mounted to said base for indexing rotation; a fixed part of said turret providing a circular series of master bolt-receiving indexing sockets, said sockets being parallel with the longitudinal axis of said turret, said part providing slide faces perpendicular to said axis and intervening between said sockets; a retractable master indexing bolt complementary to said slide faces and master sockets and normally spring-pressed toward the same, said bolt mounted to said base and confined thereby to movement in a line parallel with the turret axis; and sub-divisional indexing means for said turret including several separate differing circular sets of sub-divisional locking bolt receiving sockets concentric with and fixedly carried by said turret with slide surfaces intervening between said sets and between the sockets of each set, the axes of said sub-divisional sockets being parallel with the axis of said turret; and sub-divisional indexing and set selector and bolt means complementary to said sets and the sub-divisional sockets thereof, said bolt means being retractable with said master indexing bolt in a direction longitudinally of said turret, and being normally spring-pressed toward said sub-divisional sockets and intervening slide surfaces.

13. In an indexing head having a work-holder-carrying indexing turret mounted to a base for rotation and provided with master indexing means including a normally spring-pressed retractable bolt common to the master indexing bolt-receiving master indexing stops of the turret; said bolt being slidably confined by said base for straight line reciprocation radially of said turret and against rotatory movements on its longitudinal axis, spring means abutting said base and acting on said bolt to spring press the bolt toward operative master indexing position, an exteriorly handled cam disk loosely mounted on said bolt for relative rotation thereon and for relative longitudinal movements of the bolt through said disk, said base providing on a normally fixed abutment for one end of said cam, the opposite end of said cam providing arcuate laterally wedging cam faces and elevated flats, and cooperating abutments fixed to said bolt.

14. In an indexing head having a work-holder-carrying turret mounted to a base for indexing rotation, said turret being provided with a circular concentric set of master indexing bolt-receiving stops, and a retractable master indexing bolt mounted in said base for operative and withdrawal movements with respect to said master indexing stops; said turret, as a fixed part thereof, being provided with an added series of separate circular concentric differing sets of sub-divisional bolt-receiving indexing stops; said master bolt being provided with a projecting yoke rigid therewith and arranged in cooperative relation to said sets of sub-divisional stops; a laterally and longitudinally movable sub-divisional indexing bolt adapted to the stops of any one of said sub-divisional sets, said sub-divisional bolt being movable longitudinally of said yoke to select any one of said sub-divisional sets, and also being longitudinally movable transversely through said yoke to enter and withdraw from the sub-divisional stops of the selected set; spring means for pressing said master and sub-divisional bolts toward operative position; and manually controlled means for moving said sub-divisional bolt longitudinally of said yoke to select any one of said sub-divisional sets and setting the same for sub-divisional indexing in accordance therewith.

15. An indexing head comprising a base; a turret mounted to said base for indexing rotation and provided with master indexing means including a circular series of spaced major indexing stops and cooperating master locking and releasing means for said turret complementary to said major stops; said turret also provided with a sub-divisional indexing drum rotating and concentric therewith and formed with a series of exterior separate differing circular sets of sub-divisional indexing and bolt receiving sockets with intervening slide surfaces; said sockets being arranged in cooperative relation to said major indexing stops; and manually controlled sub-divisional selector and locking bolt means for selecting any one of said sub-divisional sets and cooperating with the slide surfaces and sockets of the selected set for indexing the turret accordingly.

16. Apparatus as required by claim 15, where said selector and locking bolt means comprises a selector rotor bodily movable radially toward and from said drum and provided with bolts projecting radially from the rotor at different positions, said bolts corresponding and being complementary to the different sets of indexing sockets, respectively, and adapted to turret-locking engagement with the stops of their respective sets, a dial disk rotating with said rotor provided with radial locking slots corresponding to said projecting bolts, and means carried by said base for association with said slots one by one for temporarily locking said disk.

17. Apparatus as required by claim 15, where said drum is laminated and comprises a series of parallel disks, one for each set of indexing sockets and slide surfaces, said disks being rigidly secured together.

18. Apparatus as required by claim 15, where the selector and locking bolt means comprises a rotor having differently arranged radially projecting bolts, one for each set of indexing sockets, said rotor being laminated and including parallel disks each having one of said radially projecting bolts, said disks being rigidly secured together.

19. Apparatus as required by claim 15, where the selector and locking bolt means comprises a carrier confined to straight line movement radially of and toward and from operative relation to said drum, with a series of transverse guides, one for each one of said circular sets of indexing stops, and a manually controlled removable and applicable indexing locking bolt adapted to any one of said guides and any one of said sets, said base providing a series of guide passages alined with said transverse guides, for said removable and applicable bolt, and a visible scale identifying each passage with a different one of said sets of indexing stops.

20. Apparatus as required by claim 15, where the selector and locking bolt means comprises an exterior portion of the base provided with a series of transverse guideways therethrough opposite said drum with said guideway in radial alinement with said separated sets of indexing stops of the drum, respectively, and a manually removable and applicable slide bolt, complementary to any one of said guideways and the indexing stops in alinement therewith.

21. An indexing head comprising a base having a longitudinal bore, said base as a rigid part thereof including an annular rigid bearing portion surrounding and concentric with the longitudinal axis of said bore and provided with a longitudinally-elongated inner bearing surface of truncated conical form longitudinally contracting outwardly; a rotary indexing turret including a spindle longitudinally arranged in said bore of the base and at its outer end provided with a transverse face plate rigid therewith to carry a work holder, and rotatable on the outer end face of said rigid annular bearing portion, said rotary spindle provided with a longitudinally-elongated exterior bearing surface of truncated conical form longitudinally contracting outwardly and complementary to said conical bearing surface of said fixed annular base, and longitudinally held outwardly into rotary bearing relation to said fixed annular bearing surface by said face plate; means for rotatably indexing said turret step by step; and means for locking said turret at each indexing step and for releasing the same for rotary indexing movements.

22. An indexing head comprising a base having a longitudinal bore and a rigid annular portion providing an inner annular longitudinal bearing surface of longitudinal truncated cone form; a rotary indexing turret including an exterior transverse face plate for carrying a work holder, and supported by and seated for rotation on the outer end of said rigid annular portion, and a spindle perpendicular to the transverse plane of said face plate and normally rigid therewith and carried thereby and mounted in said base bore for indexing rotary movements with respect thereto, said spindle provided with an elongated exterior longitudinal bearing surface of truncated conical form complementary to and rotatably fitting said conical surface of the annular portion of the base, said spindle being longitudinally adjustable through said face plate, to tighten and loosen the bearing relation between said opposing complementary truncated cone bearing portions, means being provided for making such adjustment between the spindle and face plate and for setting the spindle in the desired adjustment; and indexing means for locking the rotary turret at various indexing points or steps and for releasing the same for rotary indexing movements from step to step.

23. In an indexing head of the type having a hollow base, an indexing rotatable turret comprising a transverse face plate for carrying a work holder and rotatably engaging said base and a longitudinal central spindle normally fixed to said plate and rotatably mounted in a bearing therefor in said base, and indexing and locking and releasing means for said turret; means for rendering said spindle longitudinally adjustable with respect to said face plate for taking up looseness in the spindle bearings in said base, comprising a central transverse socket in said face plate, the upper end of the spindle fitting and capable of longitudinal sliding in said socket while held against relative rotation, and provided with a longitudinal screw thread, and a ring nut complementary to said screw thread and abutting and upheld by said face plate, and rotatable on said threaded end of the spindle to longitudinally adjust said spindle with respect to the face plate.

24. In an indexing head of the type having a hollow base, an indexing rotatable turret comprising a transverse face plate for carrying a work holder and rotatably engaging said base and a longitudinal central spindle normally fixed to said plate and rotatably mounted in a bearing therefor in said base, and indexing and locking and releasing means for said turret; means for rendering said spindle longitudinally adjustable with respect to said face plate for taking up looseness in the spindle bearings in said base, comprising the provision of a central transverse bore in the face plate having an annular surrounding channel forming a transverse bottom annular fixed shoulder, the upper end of said spindle being longitudinally and exteriorly screw threaded and longitudinally slidable in said bore, means being provided to prevent relative rotary movement of the spindle, and a ring nut meshing with and rotatable on said threaded spindle end and abutting said shoulder and inset in said channel.

25. In an indexing head of the type that includes a hollow base having an annular transverse outer bearing face, and a rotary indexing turret rotatably mounted to said base and comprising a transverse face plate rotatably seated against said annular bearing face and a central longitudinal spindle normally fixed to said plate and rotatably mounted in said base, and indexing and locking and releasing means for said turret; the provision of an annular depressed channel around said face plate adjacent to said annular bearing face of the base, a dial or scale ring slidably confined in said channel for relative rotary movements therein, means for releasably locking said ring to said plate in the position to which rotatively adjusted, said ring having an exteriorly visible indexing scale of degree marks extending from zero through three hundred and sixty degrees, said base having an exteriorly visible index mark for cooperative visual association with said scale marks.

GEORGE GORTON.